(12) United States Patent
Kim et al.

(10) Patent No.: US 12,191,583 B2
(45) Date of Patent: Jan. 7, 2025

(54) ELECTRONIC DEVICE INCLUDING ANTENNA

(71) Applicant: SAMSUNG ELECTRONICS CO., LTD., Suwon-si (KR)

(72) Inventors: Kyoungmok Kim, Suwon-si (KR); Sungjun Lee, Suwon-si (KR); Sanggon Shin, Suwon-si (KR); Oleg Feygenson, Suwon-si (KR); Chaeup Yoo, Suwon-si (KR); Soonho Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 182 days.

(21) Appl. No.: 18/086,070

(22) Filed: Dec. 21, 2022

(65) Prior Publication Data

US 2023/0170618 A1 Jun. 1, 2023

Related U.S. Application Data

(63) Continuation of application No. PCT/KR2022/018403, filed on Nov. 21, 2022.

(30) Foreign Application Priority Data

Nov. 29, 2021 (KR) ........................ 10-2021-0167271
Jan. 26, 2022 (KR) ........................ 10-2022-0011766

(51) Int. Cl.
*H01Q 1/24* (2006.01)
*H01Q 1/48* (2006.01)
(Continued)

(52) U.S. Cl.
CPC ............. *H01Q 9/0442* (2013.01); *H01Q 1/48* (2013.01); *H01Q 5/328* (2015.01)

(58) Field of Classification Search
CPC .. H01Q 1/24; H01Q 1/38; H01Q 1/46; H01Q 1/48; H01Q 1/243; H01Q 5/328;
(Continued)

(56) References Cited

U.S. PATENT DOCUMENTS

2014/0031093 A1 1/2014 Song et al.
2015/0311595 A1 10/2015 Park et al.
(Continued)

FOREIGN PATENT DOCUMENTS

CN 103219582 B 8/2016
JP 2008-211479 A 9/2008
(Continued)

OTHER PUBLICATIONS

International Search Report and Written Opinion dated Mar. 3, 2023 for PCT/KR2022/018403.
(Continued)

*Primary Examiner* — Tung X Le
(74) *Attorney, Agent, or Firm* — Nixon & Vanderhye P.C.

(57) ABSTRACT

An electronic device may include a housing including a first side surface, a first conductive portion disposed between at least a first segmenting portion and a second segmenting portion formed in the first side surface, and including a first feeding point, a printed circuit board disposed inside the housing and including a ground, a first electronic component disposed adjacent to the first conductive portion, a first conductive connection member electrically connected to the first electronic component, a first wireless communication circuit electrically connected to the first feeding point, a processor electrically connected to the first wireless communication circuit, and a matching circuit electrically connected to the first conductive connection member and the ground, and configured to electrically connect or disconnect the first conductive connection member and the ground (Continued)

under control of the processor. The radiation performance of the antenna can be improved by adjusting the resonance frequency of the antenna through the control of the matching circuit. Other various embodiments are possible.

20 Claims, 20 Drawing Sheets

(51) Int. Cl.
*H01Q 5/328* (2015.01)
*H01Q 9/04* (2006.01)
*H04M 1/02* (2006.01)

(58) Field of Classification Search
CPC ........ H01Q 5/335; H01Q 9/0407; H01Q 9/42; H01Q 9/0442; H01Q 21/08; H04M 1/02; H04M 1/0214; H04M 1/0247; H04M 1/0254
See application file for complete search history.

(56) References Cited

U.S. PATENT DOCUMENTS

| | | |
|---|---|---|
| 2017/0170562 A1 | 6/2017 | Lee et al. |
| 2020/0119429 A1 | 4/2020 | Park et al. |
| 2020/0136231 A1 | 4/2020 | Lee et al. |
| 2020/0303810 A1 | 9/2020 | Tsai et al. |
| 2021/0359392 A1* | 11/2021 | Won ........................ H01Q 5/307 |
| 2022/0037791 A1* | 2/2022 | Li ............................ H01Q 1/44 |
| 2022/0385311 A1 | 12/2022 | Shin et al. |
| 2023/0246328 A1* | 8/2023 | Tsai ........................ H01Q 21/28 343/751 |

FOREIGN PATENT DOCUMENTS

| | | |
|---|---|---|
| KR | 10-2014-0013846 A | 2/2014 |
| KR | 10-2015-0124096 A | 11/2015 |
| KR | 10-2016-0100594 | 8/2016 |
| KR | 10-2020-0002085 | 1/2020 |
| KR | 10-2020-0042611 A | 4/2020 |
| KR | 10-2020-0046303 A | 5/2020 |
| KR | 10-2020-0144686 | 12/2020 |
| KR | 10-2021-0101711 A | 8/2021 |
| WO | WO 2023/096285 A1 | 6/2023 |

OTHER PUBLICATIONS

Notification of Publication dated Jun. 1, 2023 for PCT/KR2022/018403.

* cited by examiner

ELECTRONIC DEVICE INCLUDING ANTENNA

CROSS-REFERENCE TO RELATED APPLICATIONS

This application is a continuation of International Application No. PCT/KR2022/018403, filed Nov. 21, 2022, designating the United States, in the Korean Intellectual Property Receiving Office, and claiming priority to Korean Patent Application No. 10-2021-0167271, filed Nov. 29, 2021, in the Korean Intellectual Property Office, and to Korean Patent Application No. 10-2022-0011766, filed Jan. 26, 2022, in the Korean Intellectual Property Office, the disclosures of which are all hereby incorporated by reference herein in their entireties.

BACKGROUND

Field

Various example embodiments relate to an electronic device including at least one antenna.

Description of Related Art

The use of an electronic device such as a smart phone of bar type, foldable type, rollable type or sliding type, or a tablet PC is increasing, and various functions are provided to the electronic device.

The electronic device may transmit and receive a phone call and various data with another electronic device through wireless communication.

In order to perform wireless communication with another electronic device using a network, the electronic device may include at least one antenna.

SUMMARY

At least a portion of a housing forming the exterior of the electronic device may be formed of a conductive material (e.g., metal).

At least the portion of the housing formed of the conductive material may be used as an antenna (or antenna radiator) for performing wireless communication. For example, the housing of the electronic device may be divided through at least one segmenting portion (e.g., a slit and/or opening) and be used as an antenna.

The electronic device may include a printed circuit board (PCB) on which various electronic components are disposed. These electronic components may be electrically connected using a conductive connection member (e.g., a flexible printed circuit board; FPCB).

When the conductive connection member is disposed adjacent to the antenna (e.g., a conductive portion), the radiation performance of the antenna may be deteriorated due to parasitic resonance generated through the conductive connection member.

Various example embodiments are to provide an electronic device capable of improving the antenna radiation performance by using a coupling structure between an antenna (e.g., a conductive portion) and an electronic component electrically connected to a matching circuit and a conductive connection member (e.g., FPCB).

The technical problems to be achieved in the disclosure are not limited to the above-mentioned problems, and other technical problems not mentioned are clearly understood from the following description by a person skilled in the art to which the disclosure belongs.

According to various example embodiments, an electronic device may include a housing including a first side surface, a first conductive portion disposed between, directly or indirectly, a first segmenting portion and a second segmenting portion formed in the first side surface, and including a first feeding point, a printed circuit board disposed inside the housing and including a ground, a first electronic component disposed adjacent to the first conductive portion, a first conductive connection member electrically connected, directly or indirectly, to the first electronic component, a first wireless communication circuit electrically connected, directly or indirectly, to the first feeding point, a processor electrically connected, directly or indirectly, to the first wireless communication circuit, and a matching circuit electrically connected, directly or indirectly, to the first conductive connection member and the ground, and configured to electrically connect or disconnect the first conductive connection member and the ground under control of the processor.

According to various example embodiments, an electronic device may include a housing including a first side surface and a second side surface, a first conductive portion disposed between, directly or indirectly, a first segmenting portion and a second segmenting portion formed in the first side surface, and including a first feeding point, a second conductive portion disposed between, directly or indirectly, a third segmenting portion and a fourth segmenting portion formed in the second side surface, and including a second feeding point, a printed circuit board disposed inside the housing and including a ground, a first electronic component disposed adjacent to the first conductive portion, an antenna module (comprising at least one antenna) disposed adjacent to the second conductive portion, a first conductive connection member electrically connected to the first electronic component, a second conductive connection member electrically connected to the antenna module, a first wireless communication circuit electrically connected to the first feeding point, a second wireless communication circuit electrically connected to the second feeding point, a processor electrically connected to the first wireless communication circuit and the second wireless communication circuit, and a matching circuit electrically connected to the first conductive connection member and the ground and/or to the second conductive connection member and the ground, and configured to electrically connect or disconnect the first conductive connection member and the ground and/or the second conductive connection member and the ground under control of the processor.

According to various example embodiments, an electronic component electrically connected to a matching circuit via a conductive connection member (e.g., FPCB) is electrically connected to an antenna (e.g., a conductive portion) through a coupling structure. Accordingly, the radiation performance of the antenna can be improved by adjusting the resonance frequency of the antenna through the control of the matching circuit.

In addition, various effects will be explicitly or implicitly provided in the disclosure.

BRIEF DESCRIPTION OF DRAWINGS

The above and other aspects, features, and advantages of certain embodiments will be more apparent from the following detailed description, taken in conjunction with the accompanying drawings, in which.

DETAILED DESCRIPTION

Figure 1:
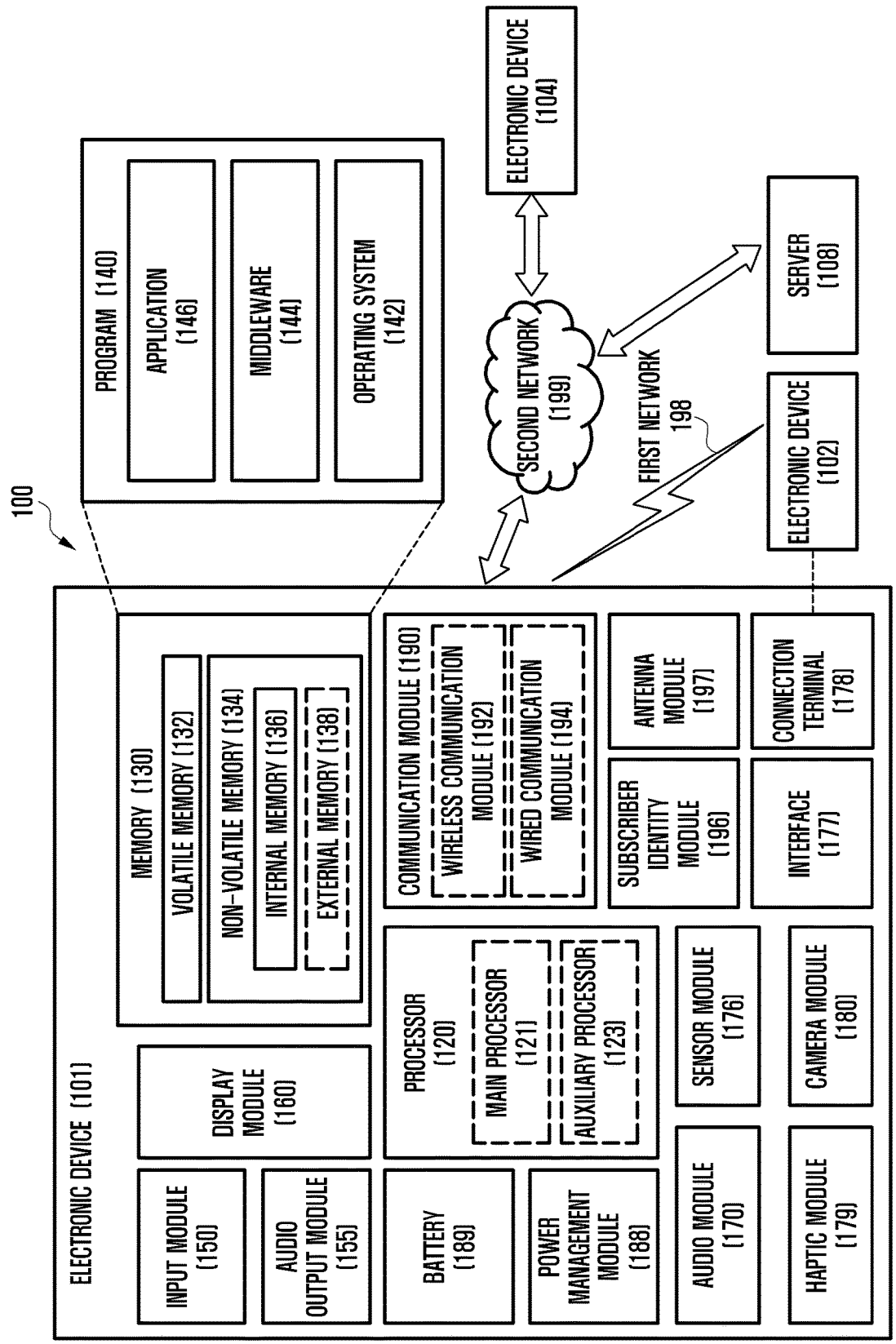
FIG. 1 is a block diagram illustrating an electronic device in a network environment according to various example embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element.

As used in connection with various example embodiments, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various example embodiments may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
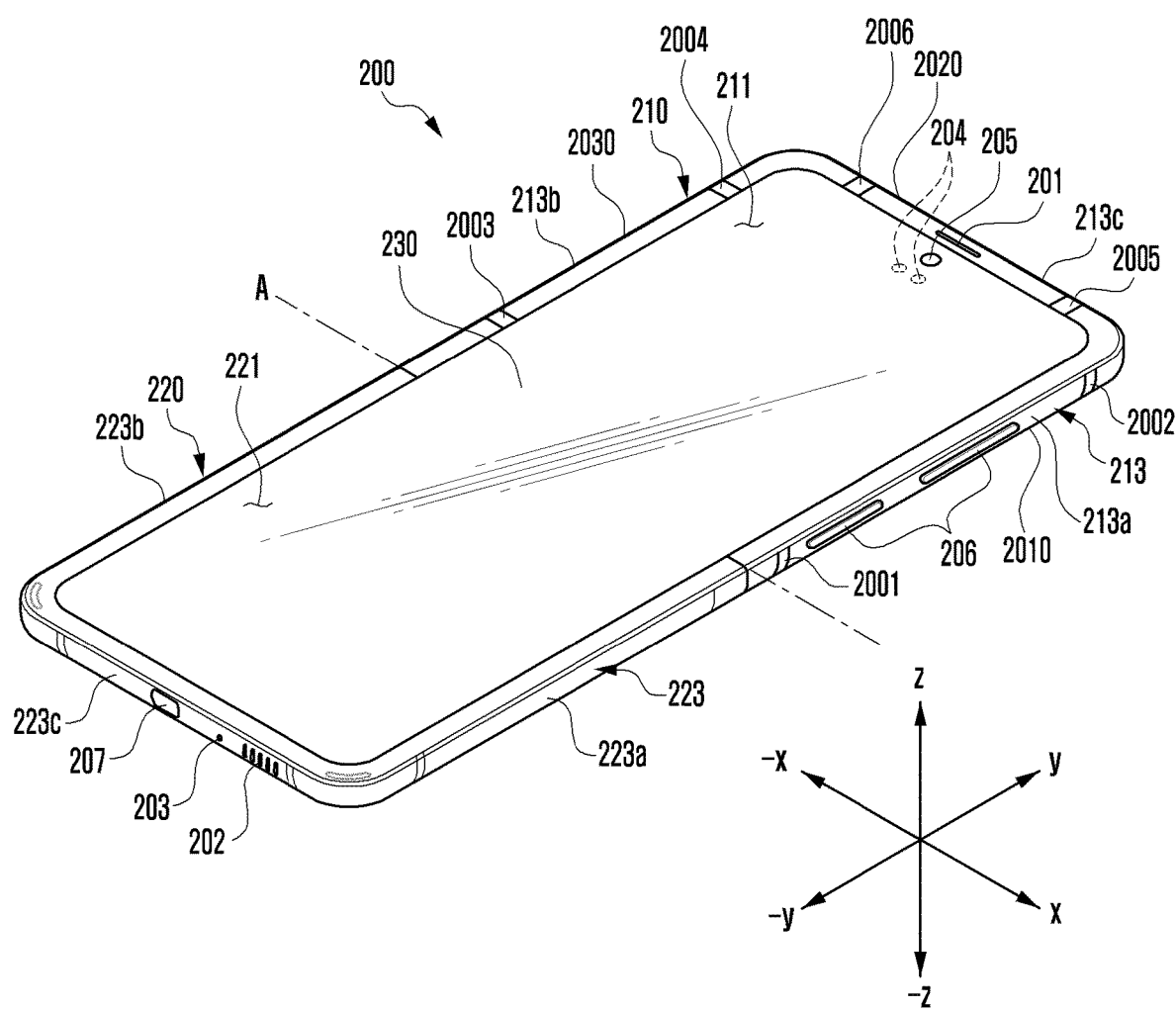
FIG. 2A is a perspective view illustrating a front surface of an electronic device in an unfolded state according to various example embodiments.
Figure 2B:
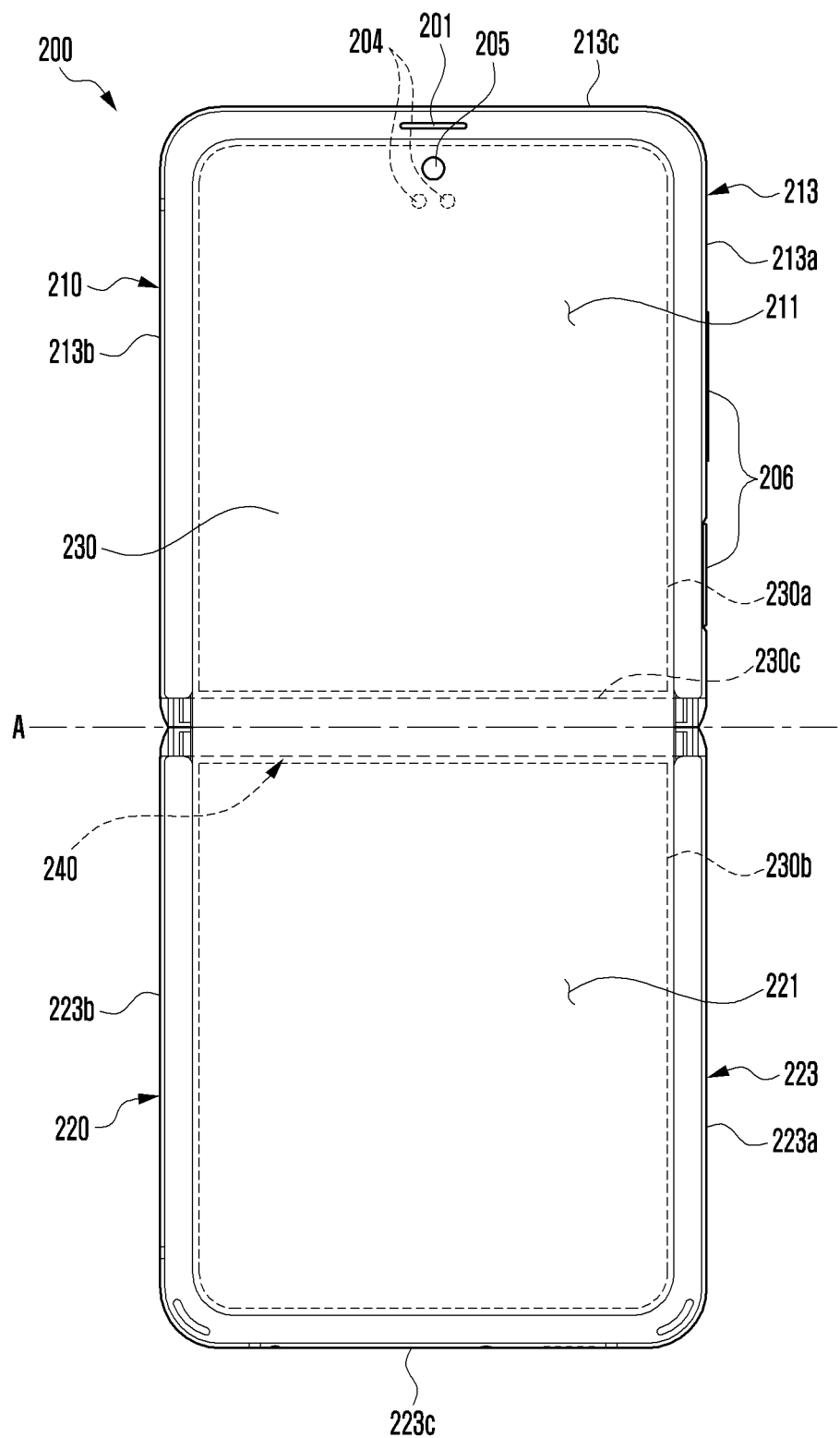
FIG. 2B is a plan view illustrating a front surface of an electronic device in an unfolded state according to various example embodiments.
Figure 2C:
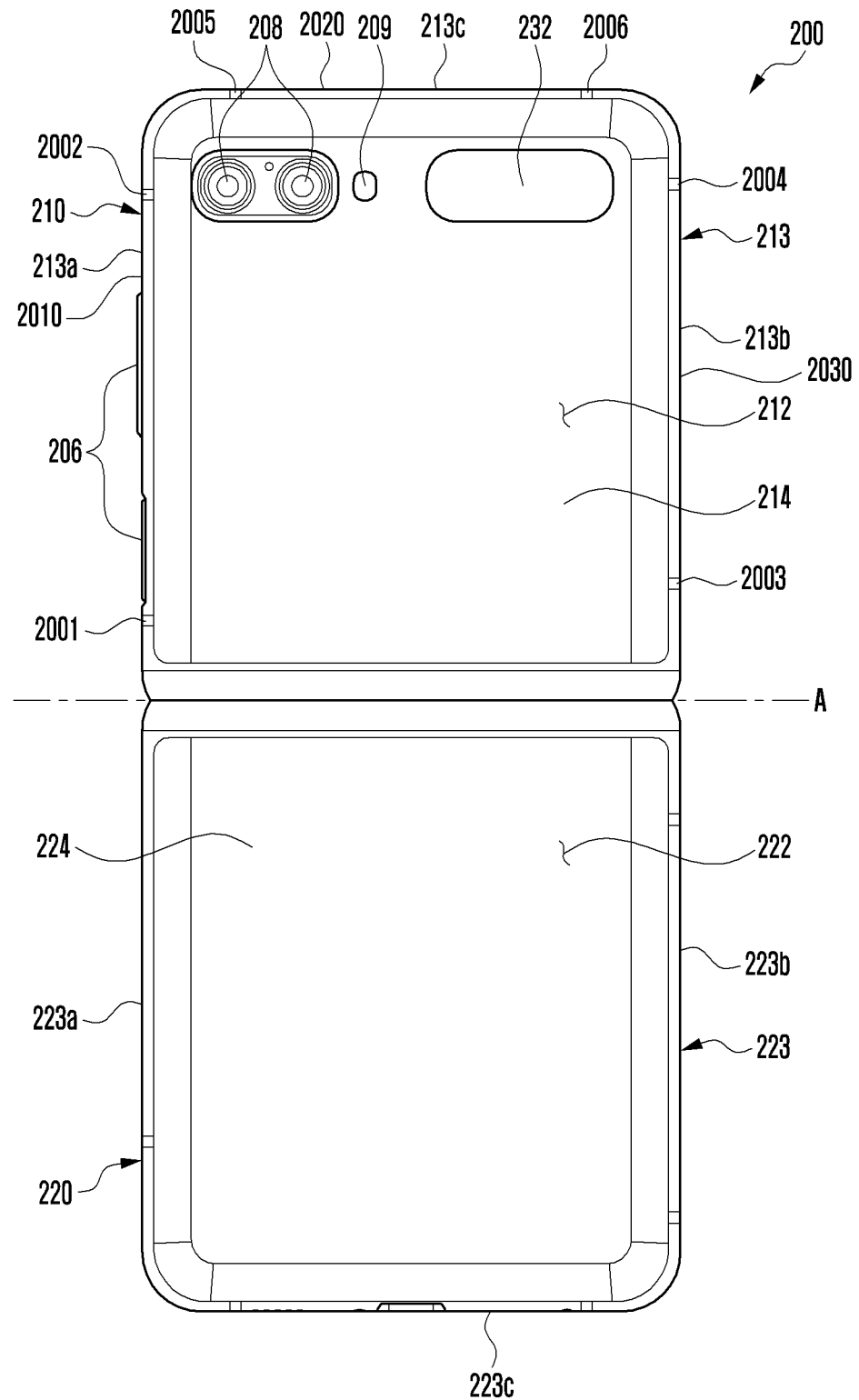
FIG. 2C is a plan view illustrating a rear surface of an electronic device in an unfolded state according to various example embodiments.

FIG. 2A is a perspective view illustrating a front surface of an electronic device in an unfolded state according to various example embodiments. FIG. 2B is a plan view illustrating a front surface of an electronic device in an unfolded state according to various example embodiments. FIG. 2C is a plan view illustrating a rear surface of an electronic device in an unfolded state according to various example embodiments.

Figure 3A:
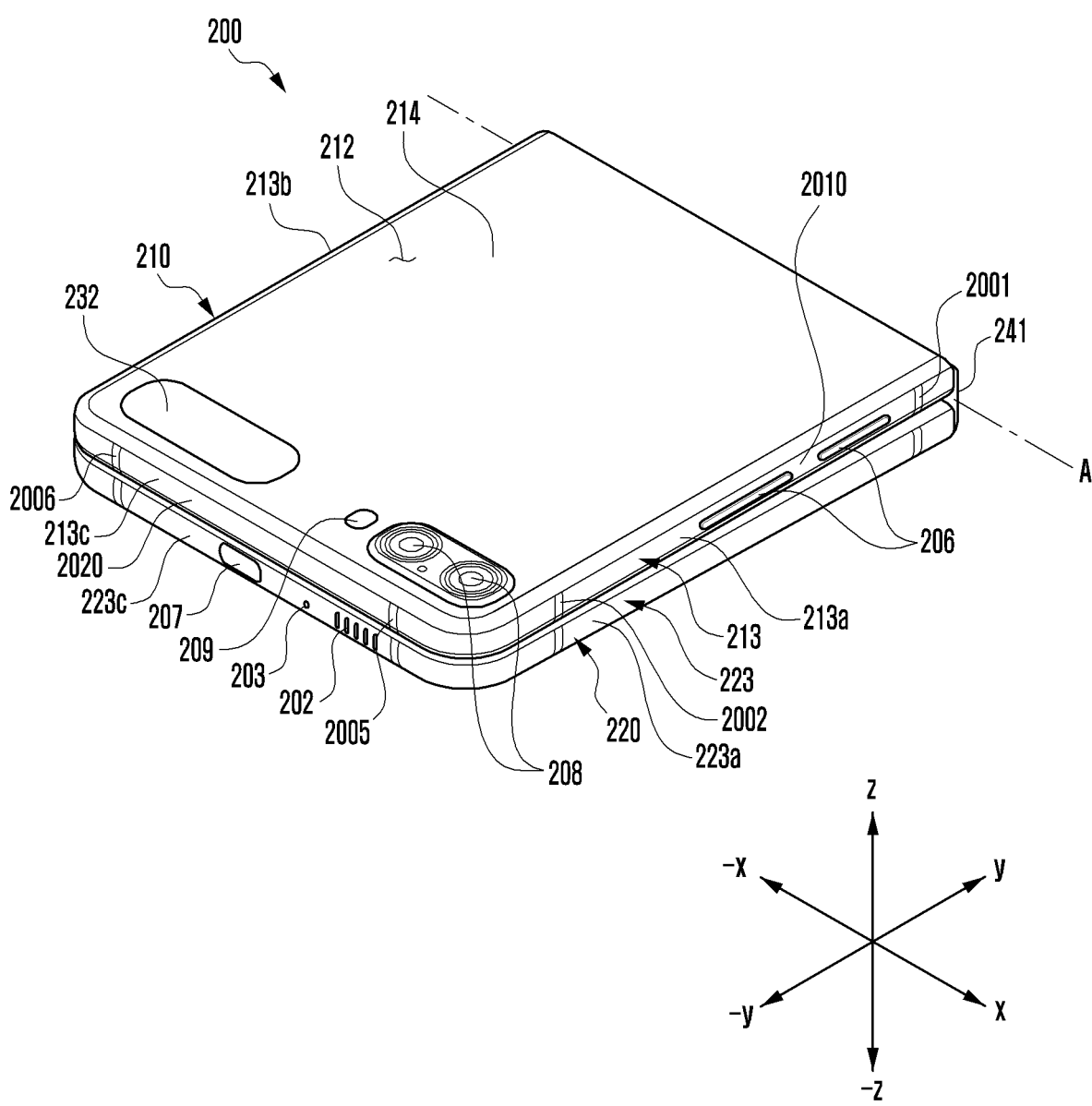
FIG. 3A is a perspective view illustrating an electronic device in a folded state according to various example embodiments.
Figure 3B:
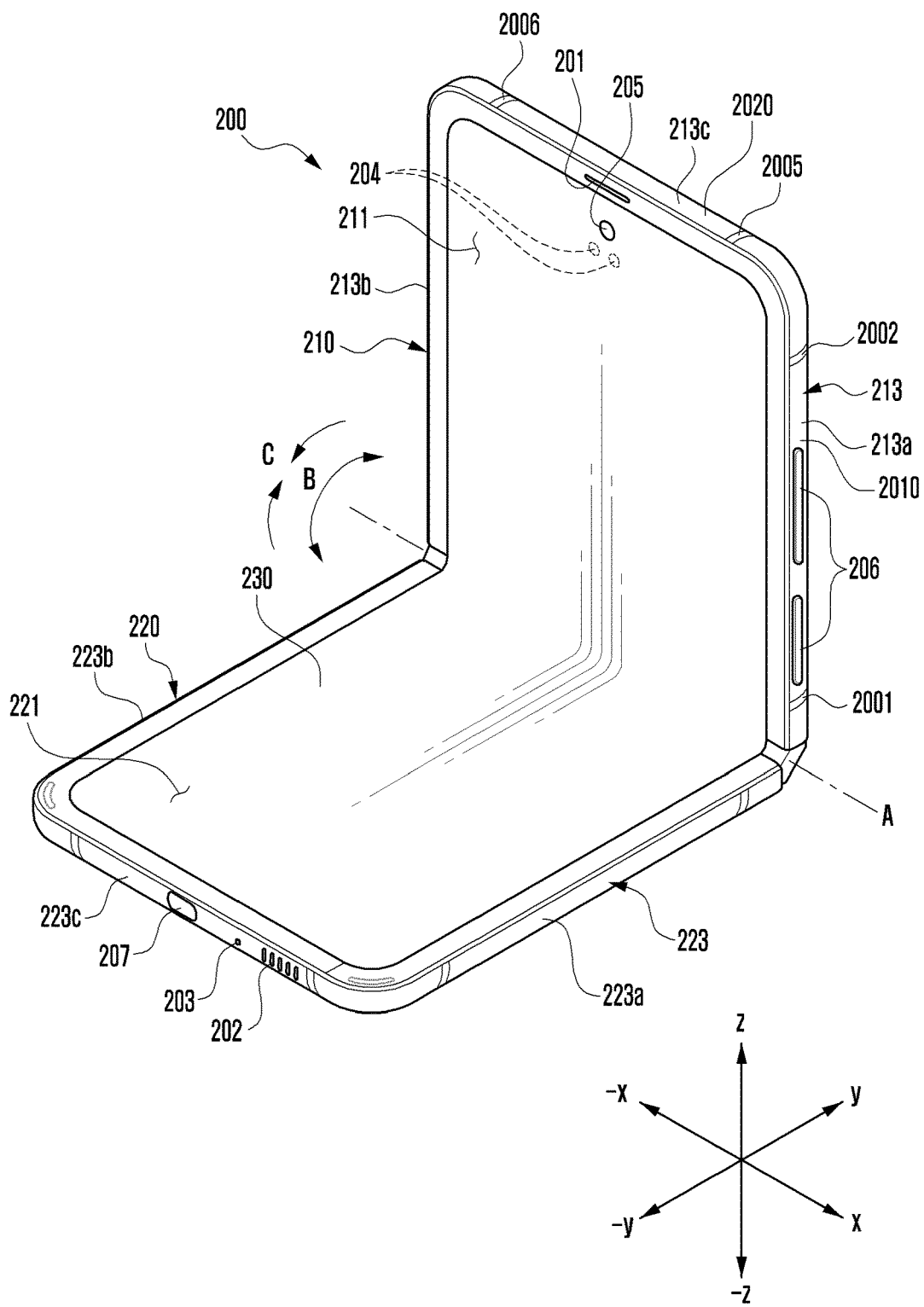
FIG. 3B is a perspective view illustrating a front surface of an electronic device in an intermediate state according to various example embodiments.

FIG. 3A is a perspective view illustrating an electronic device in a folded state according to various example embodiments. FIG. 3B is a perspective view illustrating a front surface of an electronic device in an intermediate state according to various example embodiments.

An electronic device 200 (e.g., the electronic device 101 in FIG. 1) shown in FIGS. 2A to 3B may include, for example, a foldable electronic device that is folded or unfolded in a longitudinal direction. Although an embodiment is described with respect to a foldable electronic device that is folded or unfolded in the longitudinal direction, the same may be applied to a foldable electronic device that is folded or unfolded in the transverse direction.

In an embodiment, although a foldable electronic device is described as an example, the disclosure is not limited to this example and may also be applied to electronic devices such as a bar type, a rollable type, a sliding type, a wearable type, a tablet PC, and/or a notebook PC.

Figure 4:
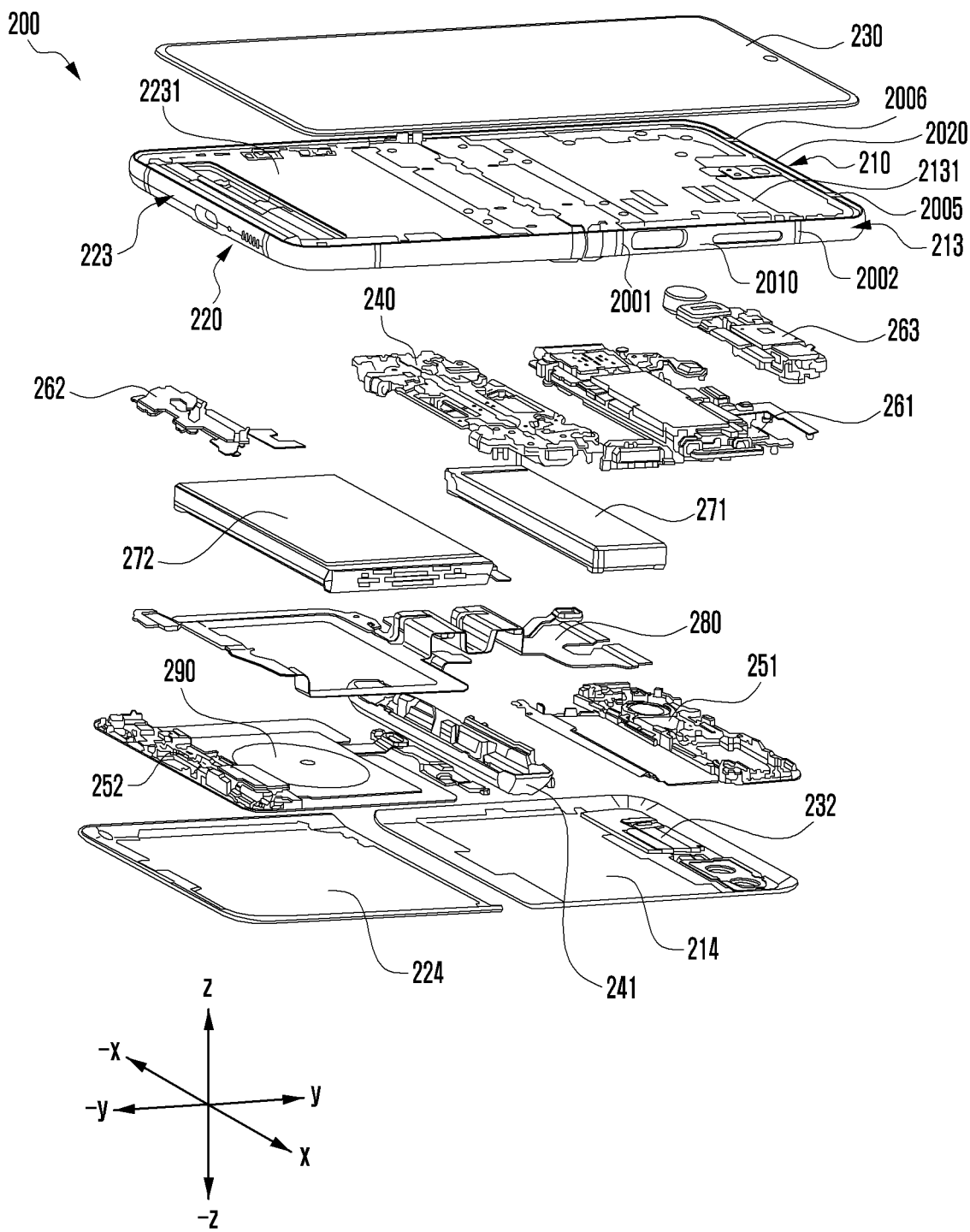
FIG. 4 is an exploded perspective view of an electronic device according to various example embodiments.

With reference to FIGS. 2A to 3B, the electronic device 200 (e.g., the electronic device 101 in FIG. 1) according to various example embodiments may include a pair of housings (e.g., a first housing 210 and a second housing 220) (e.g., a foldable housing) that face each other and are folded based on a hinge module 240 (e.g., the hinge module 240 in FIG. 2B or FIG. 4). In some embodiments, the hinge module 240 (e.g., the hinge module 240 in FIG. 2B or FIG. 4) may be disposed in the x-axis direction and the negative x-axis direction (e.g., transverse direction) or disposed in the y-axis direction and the negative y-axis direction (e.g. longitudinal direction). In some embodiments, two or more hinge modules 240 may be arranged to be folded in the same direction or in different directions.

According to various embodiments, the electronic device 200 may include a flexible display 230 (e.g., a foldable display) disposed in an area formed by the pair of housings 210 and 220. The first housing 210 and the second housing 220 are disposed on both sides (e.g., in the y-axis direction and the negative y-axis direction) about a folding axis (axis A) and may have a shape substantially symmetrical with respect to the folding axis (axis A). Depending on whether the electronic device 200 is in an unfolded (or flat) state, a folded state, or an intermediate state, an angle or distance between the first housing 210 and the second housing 220 may vary.

According to various embodiments, the pair of housings 210 and 220 may include the first housing 210 (e.g., a first housing structure) combined with a first side of the hinge module 240 (e.g., the hinge module 240 in FIG. 2B or FIG. 4) and the second housing 220 (e.g., a second housing structure) combined with a second side of the hinge module 240. The first housing 210 may have a first surface 211 facing a first direction (e.g., a front (z-axis) direction), in the unfolded state, and a second surface 212 facing a second direction (e.g., a rear (negative z-axis) direction) opposite to the first direction. The second housing 220 may have a third surface 221 facing the first direction (e.g., the front (z-axis) direction), in the unfolded state, and a fourth surface 222 facing the second direction (e.g., the rear (negative z-axis) direction).

According to an embodiment, the electronic device 200 may be operated in such a way that the first surface 211 of the first housing 210 and the third surface 221 of the second housing 220 are facing substantially the same first direction (e.g., the z-axis direction) in the unfolded state and are facing each other in the folded state. The electronic device 200 may be operated in such a way that the second surface 212 of the first housing 210 and the fourth surface 222 of the second housing 220 are facing substantially the same second direction (e.g., the negative z-axis direction) in the unfolded state and are facing opposite directions in the folded state. For example, when the first and second housings 210 and 220 are in the folded state, the second surface 212 may face the first direction (e.g., the z-axis direction), and the fourth surface 222 may face the second direction (e.g., the negative z-axis direction).

According to various embodiments, the first housing 210 may include a first side frame 213 forming at least in part the exterior of the electronic device 200, and a first rear cover 214 combined with the first side frame 213 and forming at least a portion of the second surface 212 of the electronic device 200. The first side frame 213 may have a third side surface 213c, a second side surface 213b extending from one end of the third side surface 213c, and a first side surface 213a extending from the other end of the third side surface 213c. The first side frame 213 may be formed in a quadrangular (e.g., square or rectangular) shape through the third side surface 213c, the second side surface 213b, and the first side surface 213a.

Although in an embodiment the third side surface 213c, the second side surface 213b, and the first side surface 213a are provided with ordinal numbers and reference numbers for convenience of description, such ordinal numbers and reference numbers of the third, second, and first side surfaces 213c, 213b, and 213a may be variously changed in other embodiments.

According to various embodiments, the second housing 220 may include a second side frame 223 forming at least in part the exterior of the electronic device 200, and a second rear cover 224 combined with the second side frame 223 and forming at least a portion of the fourth surface 222 of the electronic device 200. The second side frame 223 may have a sixth side surface 223c, a fifth side surface 223b extending from one end of the sixth side surface 223c, and a fourth side surface 223a extending from the other end of the sixth side surface 223c. The second side frame 223 may be formed in a quadrangular (e.g., square or rectangular) shape through the sixth side surface 223c, the fifth side surface 223b, and the fourth side surface 223a.

Although in an embodiment the sixth side surface 223c, the fifth side surface 223b, and the fourth side surface 223a are provided with ordinal numbers and reference numbers for convenience of description, such ordinal numbers and reference numbers of the sixth, fifth, and fourth side surfaces 223c, 223b, and 223a may be variously changed in other embodiments.

According to various embodiments, the pair of housings 210 and 220 is not limited to the illustrated shape and combination and may be implemented in any other shape or by a combination and/or coupling of other parts. For example, the first side frame 213 may be integrally formed with the first rear cover 214, and the second side frame 223 may be integrally formed with the second rear cover 224.

According to various embodiments, in the unfolded state of the electronic device 200, the second side surface 213b of the first side frame 213 and the fifth side surface 223b of the second side frame 223 may be connected substantially without a gap. In the unfolded state of the electronic device 200, the first side 213a of the first side frame 213 and the fourth side 223a of the second side frame 223 may be connected substantially without a gap. According to an embodiment, in the unfolded state of the electronic device 200, the length of the second side surface 213b plus the fifth side surface 223b may be greater than the length of the third side surface 213c and/or the sixth side surface 223c. In the electronic device 200, the length of the first side surface 213a plus the fourth side surface 223a may be greater than the length of the third side surface 213c and/or the sixth side surface 223c.

According to various embodiments, the first side frame 213 and/or the second side frame 223 may include a metal or a polymer. In an embodiment, the first side frame 213 may include at least one conductive portion 2010, 2020, and 2030 (e.g., antenna radiators) electrically segmented through at least one segmenting portion 2001, 2002, 2003, 2004, 2005, and 2006 formed of a polymer. In another embodiment, the second side frame 223 may include at least one segmenting portion and at least one conductive portion formed at positions corresponding to the at least one segmenting portion 2001, 2002, 2003, 2004, 2005, and 2006 and the at least one conductive portion 2010, 2020, and 2030. In this case, the at least one conductive portion 2010, 2020, and 2030 formed in the first side frame 213 may be used as at least one antenna operating in at least one designated band (e.g., legacy band) by being electrically connected to a wireless communication module (e.g., the wireless communication module 192 in FIG. 1) disposed on a printed circuit board (e.g., the first substrate assembly 261 in FIG. 4) of the electronic device 200. Each segmenting portion may be, for example and without limitation, at least one opening and/or at least one slit.

According to various embodiments, the first rear cover 214 and/or the second rear cover 224 may be formed by, for example, at least one or combination of coated or colored glass, ceramic, polymer, or metal (e.g., aluminum, stainless steel (STS), or magnesium).

According to various embodiments, the flexible display 230 may be disposed to extend from the first surface 211 of the first housing 210 to at least a portion of the third surface 221 of the second housing 220 across the hinge module 240 (e.g., the hinge module 240 in FIG. 2B). For example, the flexible display 230 may include a first flat area 230a substantially corresponding to the first surface 211, a second flat area 230b corresponding to the second surface 221, and a folding area 230c (e.g., a bending area) that connects the first and second flat areas 230a and 230b and corresponds to the hinge module 240 (e.g., the hinge module 240 in FIG. 2B or FIG. 4).

According to an embodiment, the flexible display 230 may include an unbreakable (UB) type OLED display (e.g., curved display). However, the flexible display 230 is not limited to the above and may include a flat type display of an on-cell touch active matrix organic light-emitting diode (on-cell touch AMOLED (OCTA)) type.

According to various embodiments, in the flexible display 230, an edge (e.g., an outer surface) of the first flat area 230a may be disposed on an inner surface of the first housing 210. In the flexible display 230, an edge (e.g., an outer surface)

of the second flat area 230b may be disposed on an inner surface of the second housing 220. The edge of the flexible display 230 may be protected through a protective cap (not shown) disposed in an area corresponding to the hinge module 240 (e.g., the hinge module 240 in FIG. 2B or FIG. 4). The protective cap (not shown) may be selectively used or omitted according to the specifications of the electronic device 200.

According to various embodiments, the electronic device 200 may include a hinge housing 241 (e.g., a hinge cover). The hinge housing 241 supports the hinge module 240 (e.g., the hinge module 240 in FIG. 2B or FIG. 4) and may be disposed to be exposed to the outside in the folded state of the electronic device 200 and accommodated in a first space (e.g., an internal space of the first housing 210) and a second space (e.g., an internal space of the second housing 220) in the unfolded state so as to be substantially invisible from the outside. In some embodiments, the flexible display 230 may be disposed to extend from at least a portion of the second surface 212 to at least a portion of the fourth surface 222. In this case, the electronic device 200 may be folded so that the flexible display 230 can be visually exposed to the outside (e.g., out-folding scheme).

According to various embodiments, the electronic device 200 may include a sub-display 232 disposed separately from the flexible display 230. The sub-display 232 is disposed to be visually exposed at least in part on the second surface 212 of the first housing 210 and may display the state information of the flexible display 230 in the folded state of the electronic device 200. The sub-display 232 may be disposed to be visible from the outside through at least a portion of the first rear cover 214. In some embodiments, the sub-display 232 may be disposed on the fourth surface 222 of the second housing 220. In this case, the sub-display 232 may be disposed to be visible from the outside through at least a portion of the second rear cover 224.

According to various embodiments, the electronic device 200 may include at least one of an input device 203 (e.g., a microphone), sound output devices 201 and 202, a sensor module 204, camera devices 205 and 208, a key input device 206, and a connector port 207. In the illustrated embodiment, although each of the input device 203 (e.g., the microphone), the sound output devices 201 and 202, the sensor module 204, the camera devices 205 and 208, the key input device 206, and the connector port 207 is indicated as a hole or shape formed in the first housing 210 or the second housing 220, it may be defined as including a substantial electronic component (e.g., the input device comprising input circuitry, the sound output device comprising circuitry, the sensor module comprising at least one sensor, and/or the camera device comprising at least one camera) disposed inside the electronic device 200 and operating through the hole or shape.

According to various embodiments, the input device 203 may include at least one microphone disposed in the second housing 220. In some embodiments, the input device 203 may include a plurality of microphones disposed to detect the direction of sound. In some embodiments, the plurality of microphones may be disposed at designated locations in the first housing 210 and/or the second housing 220. The sound output devices 201 and 202 may include speakers. The sound output devices 201 and 202 may include a call receiver 201 disposed in the first housing 210 and a speaker 202 disposed in the second housing 220. In some embodiments, the input device 203, the sound output devices 201 and 202, and the connector port 207 may be disposed in a space provided in the first housing 210 and/or the second housing 220 of the electronic device 200 and exposed to the outside through at least one hole formed in the first housing 210 and/or the second housing 220. The at least one connector port 207 may be used to transmit and receive power and/or data to and from an external electronic device. In some embodiments, the at least one connector port (e.g., an ear jack hole) may accommodate a connector (e.g., an ear jack) for transmitting and receiving an audio signal to and from an external electronic device. In some embodiments, holes formed in the first housing 210 and/or the second housing 220 may be commonly used for the input device 203 and the sound output devices 201 and 202. In some embodiments, the sound output devices 201 and 202 may include a speaker (e.g., a piezo speaker) operating without holes formed in the first housing 210 and/or the second housing 220.

According to various embodiments, the sensor module 204 (e.g., the sensor module 176 in FIG. 1) may create an electrical signal or data value corresponding to an internal operating state or external environmental state of the electronic device 200. For example, the sensor module 204 may detect the external environment through the first surface 211 of the first housing 210. In some embodiments, the electronic device 200 may further include at least one sensor module disposed to detect the external environment through the second surface 212 of the first housing 210. The sensor module 204 (e.g., an illuminance sensor) may be disposed under the flexible display 230 to detect the external environment through the flexible display 230. The sensor module 204 may include at least one of a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, an illuminance sensor, a proximity sensor, a fingerprint sensor, or an ultrasonic sensor.

According to various embodiments, the camera devices 205 and 208 may include a first camera device 205 (e.g., a front camera device) disposed on the first surface 211 of the first housing 210, and a second camera device 208 disposed on the second surface 212 of the first housing 210. The electronic device 200 may further include a flash 209 disposed near the second camera device 208. The camera device 205 and 208 may include one or more lenses, an image sensor, and/or an image signal processor. The flash 209 may include, for example, a light emitting diode or a xenon lamp. The camera devices 205 and 208 may be disposed such that two or more lenses (e.g., a wide-angle lens, an ultra-wide-angle lens, or a telephoto lens) and image sensors are located on one surface (e.g., the first surface 211, the second surface 212, the third surface 221, or the fourth surface 222) of the foldable electronic device 200. In some embodiments, the camera devices 205 and 208 may include lenses and/or an image sensor for time of flight (TOF).

According to various embodiments, the key input device 206 (e.g., a key button) may be disposed on the first side surface 213a of the first side frame 213 of the first housing 210. In some embodiments, the key input device 206 may be disposed on at least one of the other side surfaces 213b and 213c of the first housing 210 and/or the side surfaces 223a, 223b, and 223c of the second housing 220. In some embodiments, the electronic device 200 may not include some or all of the key input devices 206, and these key input devices not included may be implemented in any other form such as soft keys on the flexible display 230. In some embodiments, the key input device 206 may be implemented using a pressure sensor included in the flexible display 230.

According to various embodiments, a certain camera device (e.g., the first camera device 205) of the camera devices 205 and 208, or the sensor module 204 may be disposed to be exposed through the flexible display 230. For example, the first camera device 205 or the sensor module 204 may be disposed to be in contact with the external environment through an opening (e.g., a through-hole) formed at least in part in the flexible display 230 in the internal space of the foldable electronic device 200. Some sensor modules 204 may be disposed to perform their functions without being visually exposed through the flexible display 230 in the internal space of the electronic device 200. In this case, a region of the flexible display 230 facing the sensor module may not need an opening.

With reference to FIG. 3B, the electronic device 200 may be operated to maintain an intermediate folded state through the hinge module 240 (e.g., the hinge module 240 in FIG. 2B or FIG. 4). In this case, the electronic device 200 may control the flexible display 230 to display different contents in a display area (e.g., a first flat area 230a) corresponding to the first surface 211 and a display area (e.g., a second flat area 230b) corresponding to the third surface 221. The electronic device 200 may be operated to a substantially unfolded state (e.g., the unfolded state in FIG. 2A) and/or a substantially folded state (e.g., the folded state in FIG. 3A) from a certain inflection angle (e.g., an angle between the first and second housings 210 and 220 in the intermediate folded state) through the hinge module 240. For example, when a pressure is applied in the unfolding direction (direction B) in a state of being unfolded at such an inflection angle, the electronic device 200 may be operated to be in the unfolded state (e.g., the unfolded state in FIG. 2A) through the hinge module 240. For example, when a pressure is applied in a folding direction (direction C) in a state of being unfolded at such an inflection angle, the electronic device 200 may be operated to be in the folded state (e.g., the folded state in FIG. 3A) through the hinge module 240. The electronic device 200 may be operated to maintain the folded or unfolded state at various angles through the hinge module 240.

FIG. 4 is an exploded perspective view of an electronic device (e.g., a foldable electronic device) according to various example embodiments.

With reference to FIG. 4, the electronic device 200 (e.g., the electronic device 101 in FIG. 1) may include the first side frame 213 of the first housing 210, the second side frame 223 of the second housing 220, and the hinge module 240 (e.g., the hinge module 240 in FIG. 2B) rotatably connecting the first and second side frames 213 and 223.

According to an embodiment, the electronic device 200 may include a first support plate 2131 extending at least in part from the first side frame 213 of the first housing 210, and a second support plate 2231 extending at least in part from the second side frame 223 of the second housing 220. The first support plate 2131 may be integrally formed with the first side frame 213 or structurally combined with the first side frame 213. The second support plate 2231 may be integrally formed with the second side frame 223 or structurally combined with the second side frame 223. The electronic device 200 may include the flexible display 230 disposed to be supported by the first support plate 2131 and the second support plate 2231.

According to an embodiment, the electronic device 200 may include a first rear cover 214 combined with the first side frame 213 of the first housing 210 and providing a first space between it and the first support plate 2131, and a second rear cover 224 combined with the second side frame 223 of the second housing 220 and providing a second space between it and the second support plate 2231. In some embodiments, the first side frame 213 and the first rear cover 214 may be integrally formed. In some embodiments, the second side frame 223 and the second rear cover 224 may be integrally formed.

According to an embodiment, the electronic device 200 may include the first housing 210 (e.g., the first housing 210 in FIG. 2A) provided through the first side frame 213, the first support plate 2131, and the first rear cover 214. The electronic device 200 may include the second housing 220 (e.g., the second housing 220 in FIG. 2A) provided through the second side frame 223, the second support plate 2231, and the second rear cover 224. The electronic device 200 may include the sub-display 232 disposed to be visible from the outside through at least a portion of the first rear cover 214.

According to an embodiment, the electronic device 200 may include a first substrate assembly 261 (e.g., a main printed circuit board), a camera assembly 263, a first battery 271, and/or a first bracket 251, which are disposed in a first space between the first side frame 213 and the first rear cover 214.

According to an embodiment, the camera assembly 263 may include a plurality of camera devices (e.g., the camera devices 205 and 208 in FIGS. 2A and 3A) and may be electrically connected to the first substrate assembly 261. The first bracket 251 may provide a support structure for supporting the first substrate assembly 261 and/or the camera assembly 263.

According to an embodiment, the electronic device 200 may include a second substrate assembly 262 (e.g., a sub printed circuit board), an antenna 290 (e.g., a coil member), a second battery 272, and/or a second bracket 252, which are disposed in a second space between, directly or indirectly, the second side frame 223 and the second rear cover 224.

According to an embodiment, the electronic device 200 may include a wiring member 280 (e.g., a flexible printed circuit board (FPCB)) disposed to extend from the first substrate assembly 261 to a plurality of electronic components (e.g., the second board assembly 262, the second battery 272, and/or the antenna 290) disposed between, directly or indirectly, the second side frame 223 and the second rear cover 224 across the hinge module 240, and providing an electrical connection. The antenna 290 may include a near field communication (NFC) antenna, a wireless charging antenna, and/or a magnetic secure transmission (MST) antenna. The antenna 290 may, for example, perform short-range communication with an external device or wirelessly transmit/receive power required for charging.

According to various embodiments, the electronic device 200 may include the hinge housing 241 (e.g., the hinge cover) that supports or covers the hinge module 240 and is disposed to be exposed to the outside in the folded state (e.g., the folded state in FIG. 3A) of the electronic device 200 and accommodated in the first space and/or the second space in the unfolded state (e.g., the unfolded state in FIG. 2A) so as to be substantially invisible from the outside.

Figure 5A:
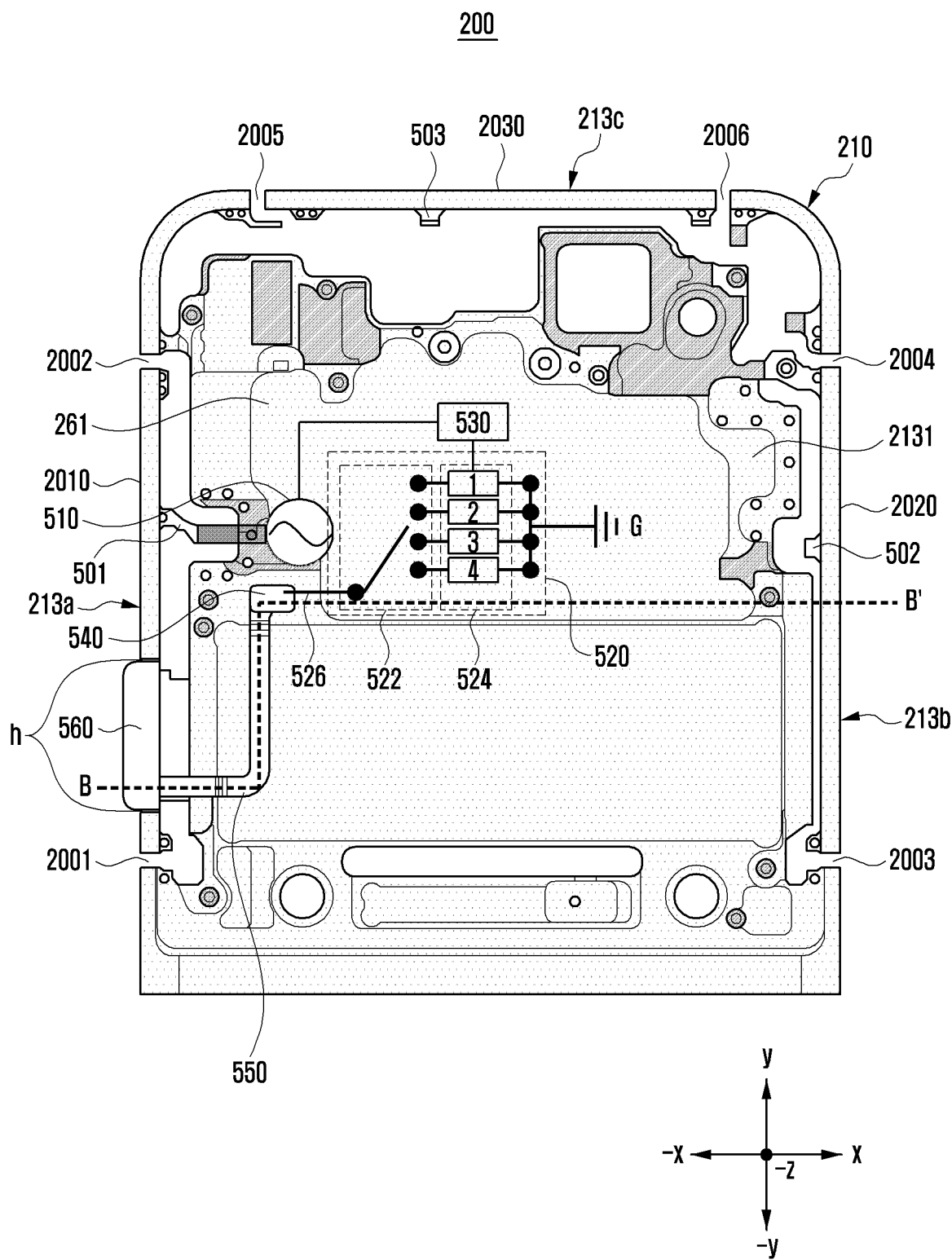
FIG. 5A is a diagram schematically illustrating a part of an electronic device including a first electronic component according to various example embodiments.
Figure 5B:
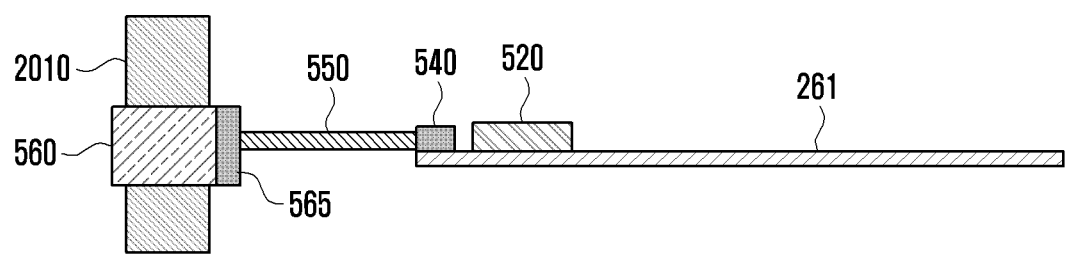
FIG. 5B is a cross-sectional view schematically illustrating a B-B' part of the electronic device shown in FIG. 5A according to various example embodiments.
Figure 5C:
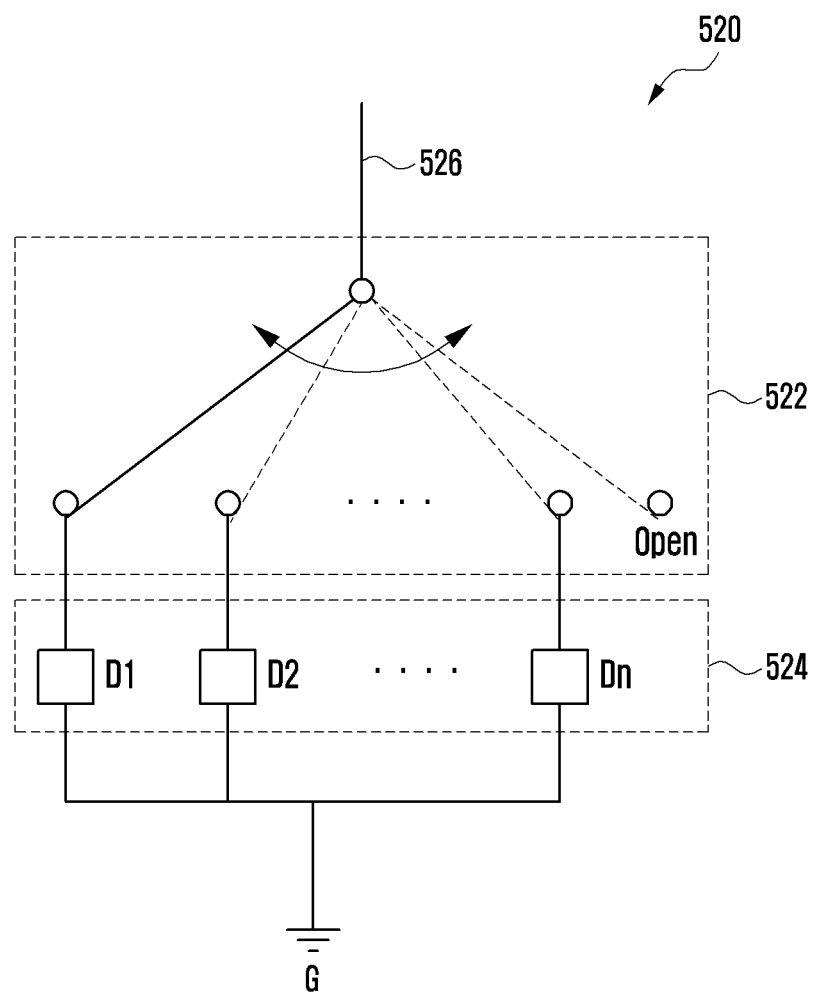
FIG. 5C is a diagram schematically illustrating a constitution of a matching circuit of an electronic device according to various example embodiments.

FIG. 5A is a diagram schematically illustrating a part of an electronic device including a first electronic component according to various example embodiments. FIG. 5B is a cross-sectional view schematically illustrating a B-B' part of the electronic device shown in FIG. 5A according to various example embodiments. FIG. 5C is a diagram schematically illustrating a constitution of a matching circuit of an electronic device according to various example embodiments.

In an embodiment, FIG. 5A is a diagram illustrating, as viewed from the negative z-axis direction, a case where the first substrate assembly 261 is disposed on one surface (e.g., the negative z-axis direction) of the first support plate 2131 of the first housing 210 shown in FIG. 4 according to various example embodiments. FIG. 5B is a schematic cross-sectional view illustrating, as viewed from one direction (e.g., the negative y-axis direction), the B-B' part of the electronic device 200 shown in FIG. 5A.

According to various embodiments, the electronic device 200 disclosed below may include the embodiments of the electronic devices 101 and 200 illustrated in FIGS. 1 to 4. In the description of the electronic device 200 disclosed below, the same reference numbers are given to some components substantially identical with those of the embodiments illustrated in FIGS. 1 to 4, and duplicate descriptions of their functions may be omitted.

According to various embodiments, even if the components substantially identical with those of the above-described embodiment illustrated in FIGS. 1 to 4 perform substantially the same functions, the names and reference numbers of some components may be changed. For example, the first housing 210 may be defined as a housing 210. The first support plate 2131 may be defined as a support plate 2131. The first substrate assembly 261 may be defined as a printed circuit board (PCB) 261.

According to an embodiment, although the following embodiment related to the electronic device 200 will describe a foldable type electronic device, the disclosure is not limited to the above and may also be applied to electronic devices such as a bar type, a rollable type, a sliding type, a wearable type, a tablet PC, and/or a notebook PC.

With reference to FIGS. 5A to 5C, the housing 210 of the electronic device 200 according to an embodiment may have the first side surface 213a, the second side surface 213b, and the third side surface 213c. The first side surface 213a may extend in the negative y-axis direction from a first portion (e.g., the negative x-axis direction) of the third side surface 213c, and the second side surface 213b may extend in the negative y-axis direction from a second portion (e.g., the x-axis direction) of the third side surface 213c.

According to an embodiment, the first side surface 213a may include a first conductive portion 2010 (e.g., an antenna radiator) formed using a first segmenting portion 2001 and a second segmenting portion 2002. For example, the first conductive portion 2010 may be disposed between, directly or indirectly, the first segmenting portion 2001 and the second segmenting portion 2002. In an embodiment, the first conductive portion 2010 may include a first feeding point 501 inward. For example, the first feeding point 501 may be a portion protruding from the inside of the first side surface 213a in the x-axis direction. In an embodiment, the first conductive portion 2010 may be electrically connected, directly or indirectly, to a first wireless communication circuit 510 (e.g., the wireless communication module 192 in FIG. 1) disposed on the printed circuit board 261 through the first feeding point 501, thereby operating as an antenna. In an embodiment, the first conductive portion 2010 may partially have a hole (h) in which a first electronic component 560 is operatively combined.

According to an embodiment, the second side surface 213b may include a second conductive portion 2020 (e.g., an antenna radiator) formed using a third segmenting portion 2003 and a fourth segmenting portion 2004. For example, the second conductive portion 2020 may be disposed between, directly or indirectly, the third segmenting portion 2003 and the fourth segmenting portion 2004. In an embodiment, the second conductive portion 2020 may include a second feeding point 502 inward. For example, the second feeding point 502 may be a portion protruding from the inside of the second side surface 213b in the negative x-axis direction. In another embodiment, the second conductive portion 2020 may be electrically connected, directly or indirectly, to a second wireless communication circuit 512 (e.g., the second wireless communication circuit 512 in FIG. 10) disposed on the printed circuit board 261 through the second feeding point 502, thereby operating as an antenna.

According to an embodiment, the third side surface 213c may include a third conductive portion 2030 (e.g., an antenna radiator) formed using a fifth segmenting portion 2005 and a sixth segmenting portion 2006. For example, the third conductive portion 2030 may be disposed between, directly or indirectly, the fifth segmenting portion 2005 and the sixth segmenting portion 2006. In an embodiment, the third conductive portion 2030 may include a third feeding point 503 inward. For example, the third feeding point 503 may be a portion protruding from the inside of the third side surface 213c in the negative y-axis direction. In another embodiment, the third conductive portion 2030 may be electrically connected, directly or indirectly, to a third wireless communication circuit 513 (e.g., the third wireless communication circuit 513 in FIG. 13) disposed on the printed circuit board 261 through the third feeding point 503, thereby operating as an antenna.

According to various embodiments, the first segmenting portion 2001, the second segmenting portion 2002, the third segmenting portion 2003, the fourth segmenting portion 2004, the fifth segmenting portion 2005, and/or the sixth segmenting portion 2006 may be formed in the form of a slit and/or opening. The first segmenting portion 2001, the second segmenting portion 2002, the third segmenting portion 2003, the fourth segmenting portion 2004, the fifth segmenting portion 2005, and/or the sixth segmenting portion 2006 may be filled with a non-conductive material. The non-conductive material may prevent, or reduce the likelihood of, foreign substances from entering the electronic device 200 from the outside. The non-conductive material which may fill one or more segmenting portion(s) may include, for example, a dielectric (e.g., an insulator) including at least one of polycarbonate, polyimide, plastic, polymer, or ceramic, for example and without limitation.

With reference to FIGS. 5A to 5C, the electronic device 200 according to an embodiment may include the printed circuit board 261 disposed inside, and/or at least partially inside, the housing 210 and including a ground G.

According to various embodiments, the printed circuit board 261 may be disposed on one surface (e.g., the negative z-axis direction) of the support plate 2131 of the housing 210. In an embodiment, the printed circuit board 261 may include a first wireless communication circuit 510, a matching circuit 520, a processor 530, and/or a connector 540. The first electronic component 560 may be disposed at least in part between, directly or indirectly, the printed circuit board 261 and the first conductive portion 2010. For example, the first electronic component 560 may be disposed adjacent, directly or indirectly, to the first conductive portion 2010.

According to an embodiment, the first wireless communication circuit 510 may be electrically connected, directly or indirectly, to the first feeding point 501 disposed on the first conductive portion 2010. The first wireless communication circuit 510 may be electrically connected, directly or indirectly, to the processor 530 (e.g., the processor 120 in FIG. 1). The first wireless communication circuit 510 may support the first conductive portion 2010 to transmit and/or receive a wireless signal. The first wireless communication circuit 510 may be electrically connected to the first feeding point 501 and/or the first conductive portion 2010 by using, for example, a conductive member (e.g., a C-clip).

According to an embodiment, the matching circuit 520 may be electrically connected to the processor 530 or the first wireless communication circuit 510. For example, the matching circuit 520 may operate under the control of the processor 530 or the first wireless communication circuit 510. Using at least one switch 522 and at least one passive element 524, the matching circuit 520 may connect or block an electrical signal inputted to the ground G through an electrical path 526. Using the electrical path 526 and the connector 540, the matching circuit 520 may be electrically connected to the first conductive connection member 550. Each conductive member herein comprises electrically conductive material. The matching circuit 520 may be electrically connected to the ground G. The matching circuit 520 may be configured to electrically connect or electrically disconnect the first conductive connection member 550 and the ground G under the control of the processor 530 or the first wireless communication circuit 510.

According to various embodiments, the matching circuit 520 may include at least one switch 522 and at least one passive element 524 (e.g., a first element 1, a second element 2, a third element 3, and/or a fourth element 4). The at least one switch 522 may be selectively connected to one of the at least one passive element 524, that is, the first element 1, the second element 2, the third element 3, or the fourth element 4. In an embodiment, the at least one switch 522 may be electrically connected to the ground G of the printed circuit board 261 through the first element 1 to the fourth element 4. The ground G may be electrically connected to the connector 540 and/or the first conductive connection member 550 through one of the at least one passive element 524 selected using the at least one switch 522. In an embodiment, the at least one passive element 524 may include a resistor, an inductor, and/or a capacitor. The matching circuit 520 may control an electrical signal between the connector 540 and the ground G under the control of the processor 530.

According to various embodiments, as shown in FIG. 5C, the matching circuit 520 may include the at least one switch 522 and the at least one passive element 524 (D1, D2, . . . , Dn, open) having different element values and electrically connected to or electrically disconnected from the electrical path 526 by the at least one switch 522. The at least one passive element 524 (e.g., lumped elements) may include a capacitor having various capacitance values and/or an inductor having various inductance values. The at least one switch 522 may selectively connect an element having a specified element value (e.g., a matching value) to the electrical path 526 under the control of the processor 530. In an embodiment, the at least one switch 522 may include a microelectro mechanical systems (MEMS) switch. The MEMS switch performs a mechanical switching operation by means of an internal metal plate and thus has a complete turn on/off characteristic, thereby not substantially affecting a change in the radiation characteristic of the antenna. In some embodiments, the at least one switch 522 may include a single pole single throw (SPST) switch, a single pole double throw (SPDT) switch, or a switch having three or more throws.

According to an embodiment, the processor 530 may be electrically connected to the first wireless communication circuit 510 and/or the matching circuit 520. The processor 530 may control the first wireless communication circuit 510 and the matching circuit 520. The processor 530 may include a communication processor and/or a radio frequency IC (RFIC).

According to an embodiment, the connector 540 may electrically connect a portion of the printed circuit board 261 and the first conductive connection member 550. The connector 540 may be connected to the matching circuit 520 through the electrical path 526. Using the connector 540, the electrical path 526 may be electrically connected to the first conductive connection member 550. Using the at least one switch 522 and the at least one passive element 524 of the matching circuit 520, the electrical path 526 may be electrically connected to the ground G.

According to an embodiment, an electrical signal delivered through the connector 540 may be transmitted to the first electronic component 560 through the first conductive connection member 550. A first end of the first conductive connection member 550 may be connected to the connector 540, and a second end of the first conductive connection member 550 may be connected to a PCB 565 of the first electronic component 560. The first conductive connection member 550 may include one of a flexible printed circuit board (FPCB), a thin film antenna (TFA), an FPCB type antenna, a conductive plate, or steel use stainless (SUS).

According to an embodiment, the first electronic component 560 may be disposed in the hole (h) partially formed in the first conductive portion 2010. The first electronic component 560 and the first conductive portion 2010 may be disposed in a coupling structure. In case that at least a part of the first conductive portion 2010 operates as an antenna radiator, the first electronic component 560 may generate coupling with the first conductive portion 2010. In an embodiment, the antenna including at least a part of the first conductive portion 2010 may adjust the resonance frequency by the at least one passive element 524 included in the matching circuit 520 connected to the first conductive connection member 550.

According to various embodiments, the first electronic component 560 may include the PCB 565. In another example, the first electronic component 560 may include a key input device (e.g., the key input device 206 in FIGS. 2A to 3B). For example, the first electronic component 560 may include a power button, a fingerprint key (e.g., a fingerprint sensor), or a volume control button. In this case, the first conductive connection member 550 may be a conductive path through which a signal inputted through the key input device is delivered to the processor 530.

Figure 6A:
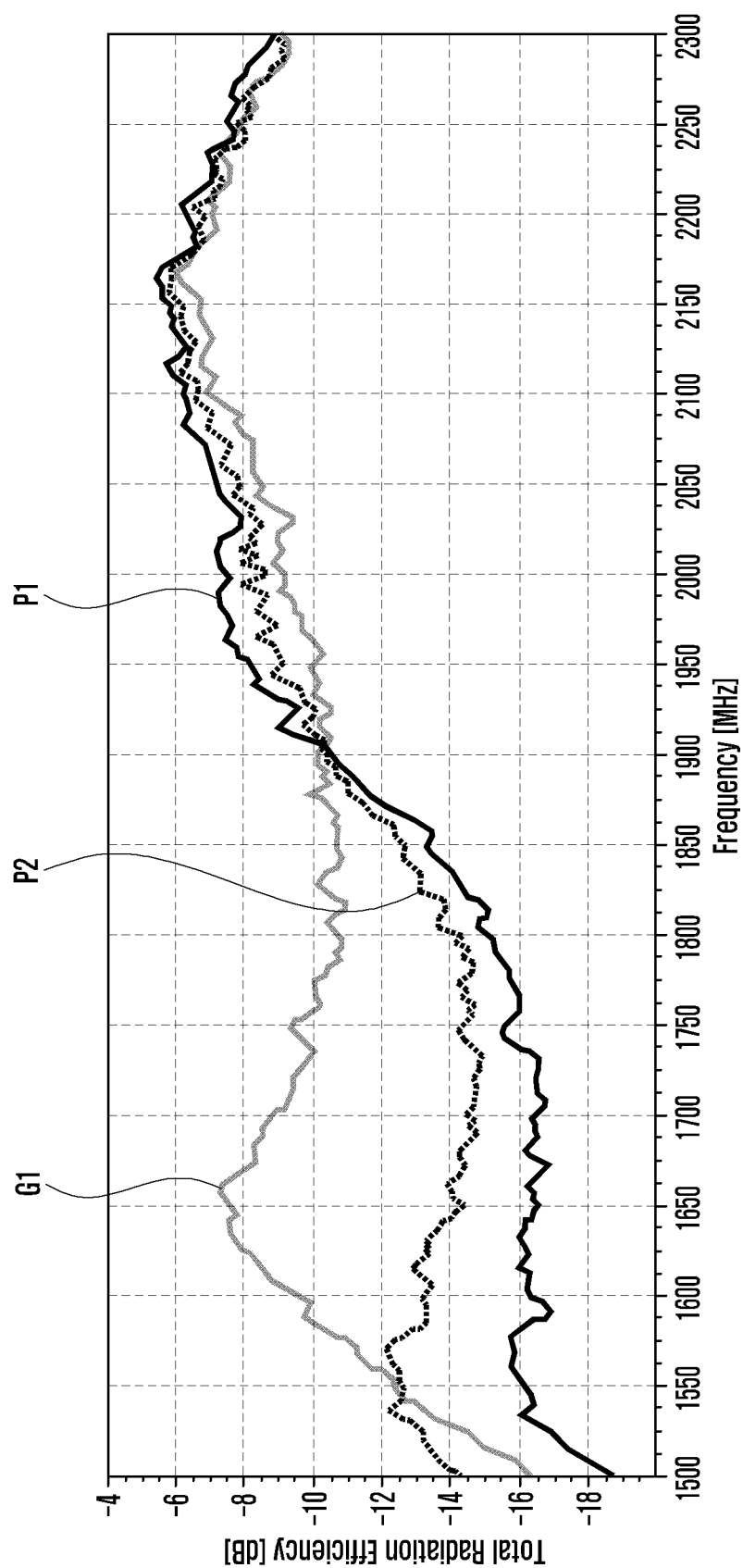
FIG. 6A is a diagram illustrating radiation efficiency of an electronic device according to an embodiment of the disclosure and radiation efficiency of an electronic device according to a comparative example.
Figure 6B:
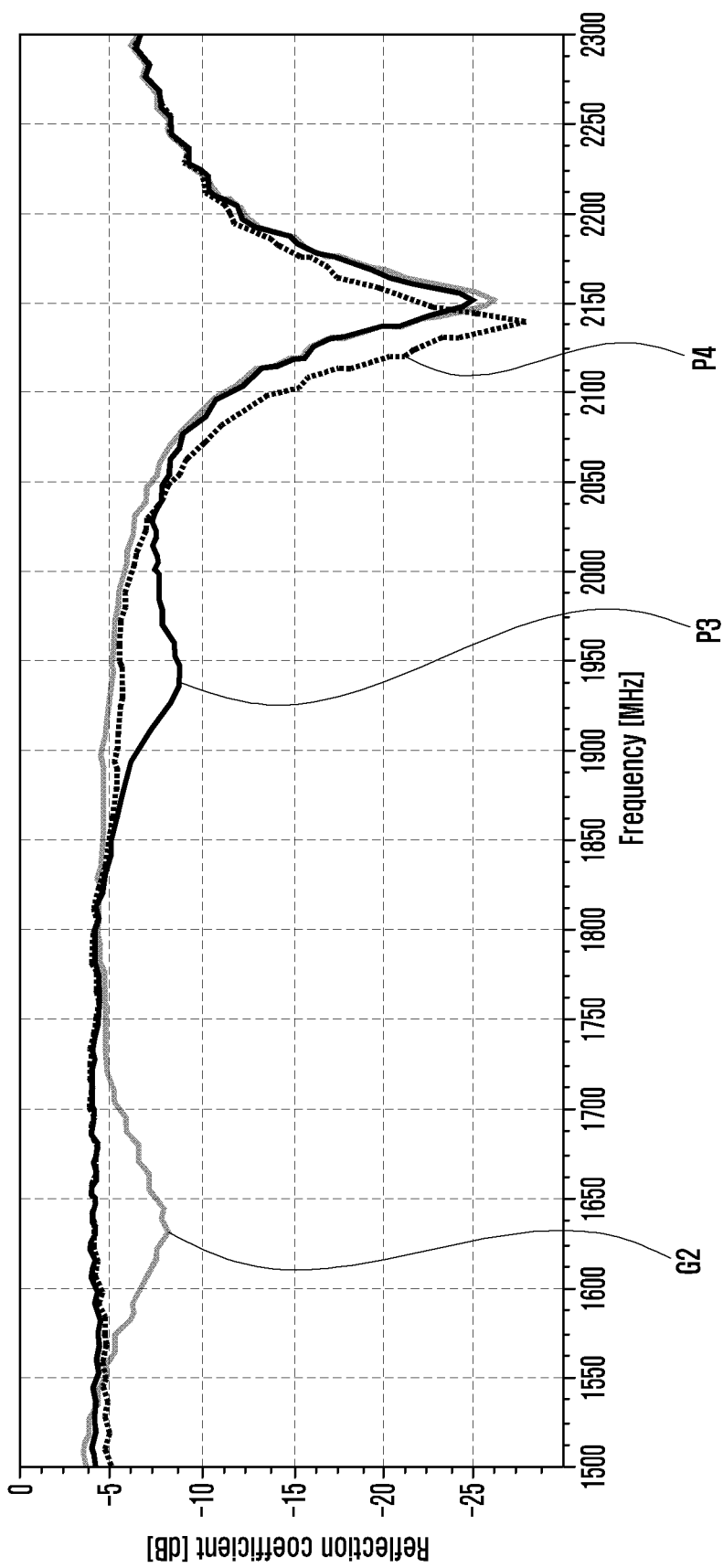
FIG. 6B is a diagram illustrating a reflection coefficient of an electronic device according to an embodiment of the disclosure and a reflection coefficient of an electronic device according to a comparative example.

FIG. 6A is a diagram illustrating radiation efficiency of an electronic device according to an embodiment and radiation efficiency of an electronic device according to a comparative example. FIG. 6B is a diagram illustrating a reflection coefficient of an electronic device according to an example embodiment of the disclosure and a reflection coefficient of an electronic device according to a comparative example.

In the electronic device 200 according to various example embodiments, the at least one switch 522 of the matching circuit 520 may be connected, directly or indirectly, to the first element 1 (e.g., an inductor) and/or the second element 2 (e.g., an inductor) of the at least one passive element 524. In case that at least a part of the first conductive portion 2010 operates as an antenna radiator, coupling between the first conductive portion 2010 and the first electronic component 560 may occur, and the resonance frequency may be adjusted depending on a connection state between the at least one passive element 524 (e.g., the first element 1 or the second element 2) included in the matching circuit 520 and the electrical path 526.

The electronic device according to a comparative example does not include the matching circuit 520 and is in a state where the first conductive connection member 550 is not electrically connected to the ground G.

With reference to FIG. 6A, it can be seen that, in the electronic device 200 according to various example embodiments, the radiation efficiency P1 in case that the at least one switch 522 of the matching circuit 520 is connected, directly or indirectly, to the first element 1 (e.g., an inductor) of the at least one passive element 524 and the radiation efficiency P2 in case that the at least one switch 522 of the matching circuit 520 is connected, directly or indirectly, to the second element 2 (e.g., an inductor) of the at least one passive element 524 are improved in a band of about 1900 MHz to 2200 MHz, compared to the radiation efficiency G1 of the electronic device according to the comparative example.

With reference to FIG. 6B, it can be seen that, in the electronic device 200 according to various example embodiments, the reflection coefficient P3 in case that the at least one switch 522 of the matching circuit 520 is connected, directly or indirectly, to the first element 1 (e.g., an inductor) of the at least one passive element 524 and the reflection coefficient P4 in case that the at least one switch 522 of the matching circuit 520 is connected to the second element 2 (e.g., an inductor) of the at least one passive element 524 satisfy a reflection coefficient of −6 dB in a band of about 2000 MHz to 2300 MHz, substantially similar to the reflection coefficient G2 of the electronic device according to the comparative example.

Figure 7A:
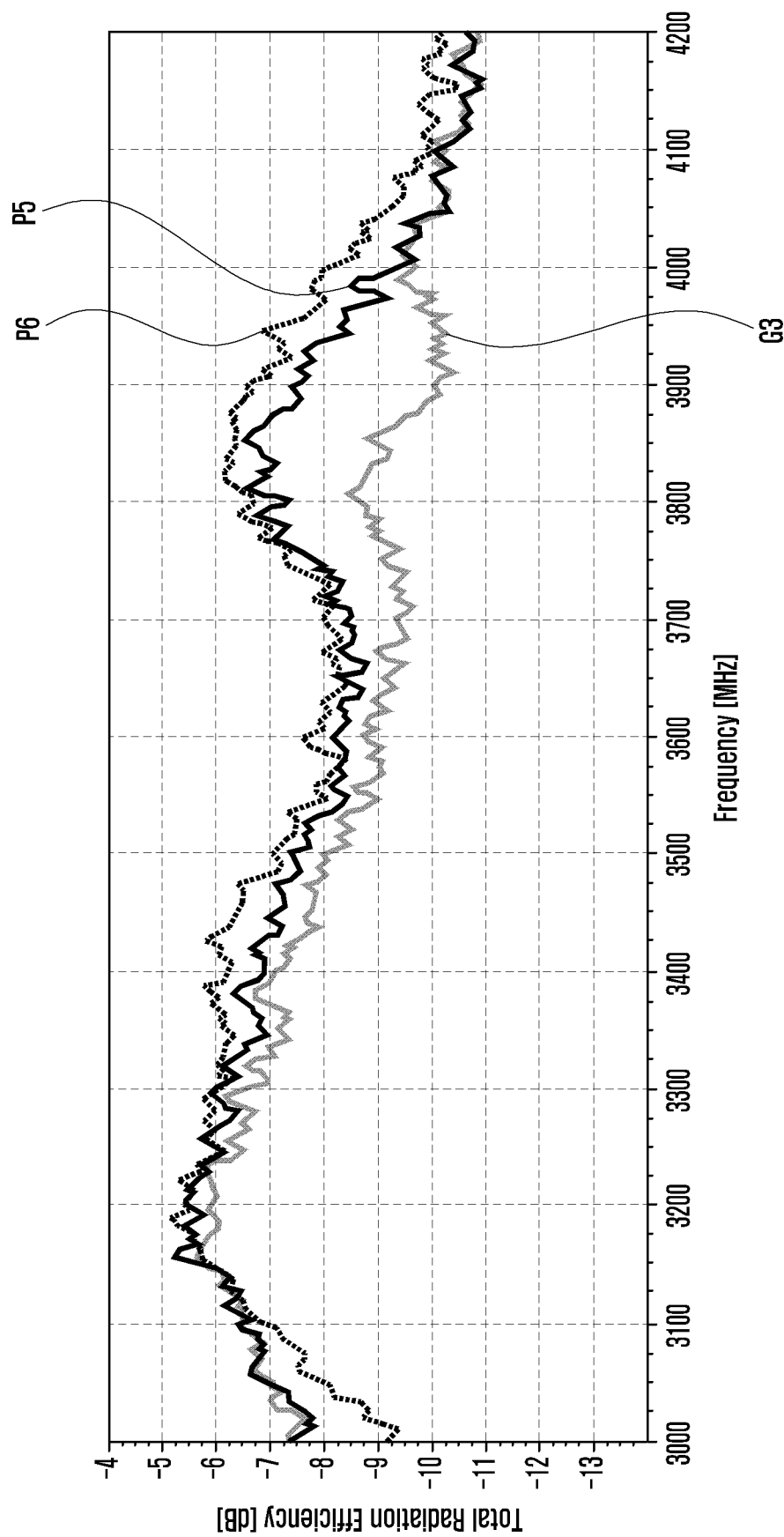
FIG. 7A is a diagram illustrating radiation efficiency of an electronic device according to various example embodiments and radiation efficiency of an electronic device according to a comparative example.
Figure 7B:
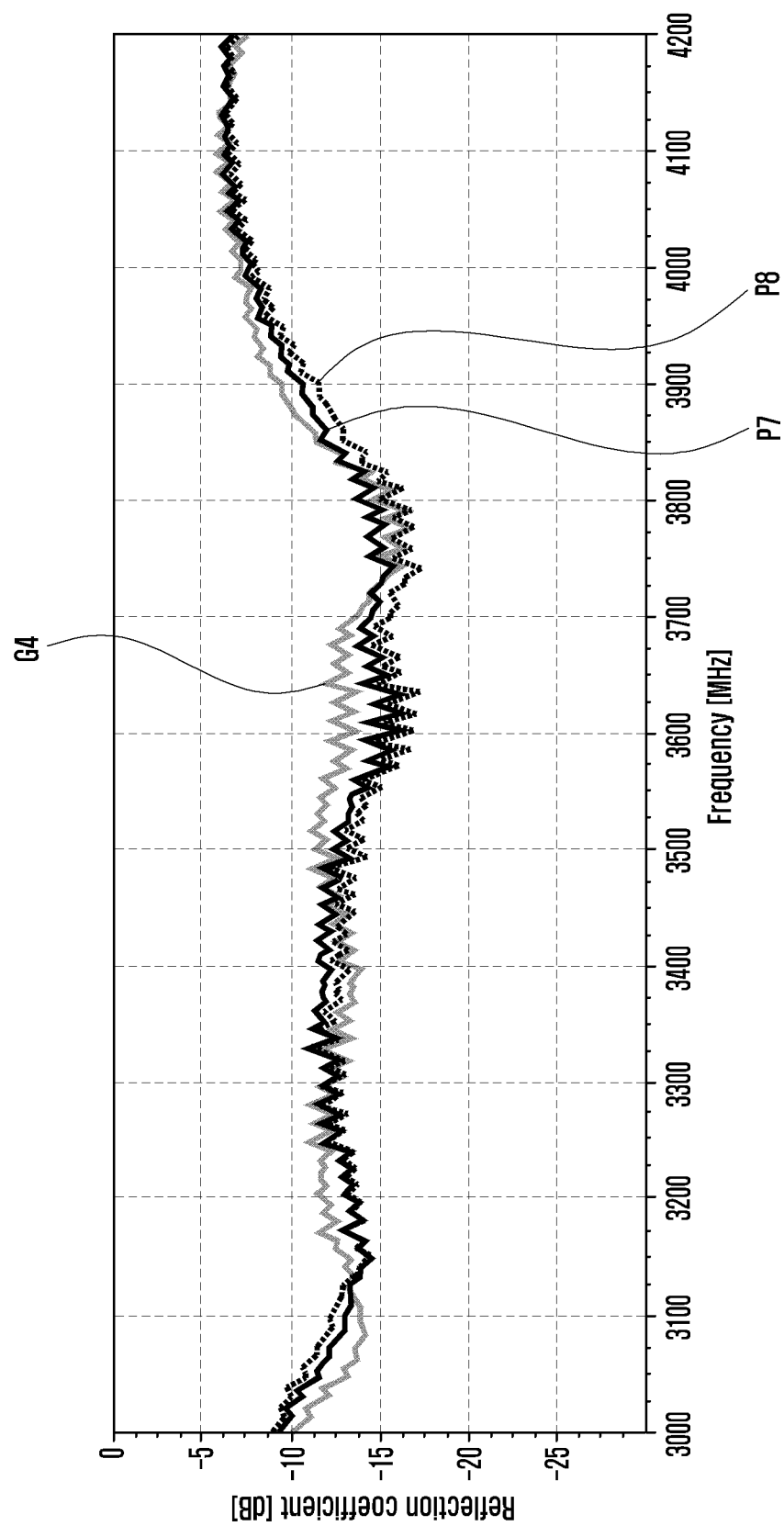
FIG. 7B is a diagram illustrating a reflection coefficient of an electronic device according to various example embodiments and a reflection coefficient of an electronic device according to a comparative example.

FIG. 7A is a diagram illustrating radiation efficiency of an electronic device according to various example embodiments and radiation efficiency of an electronic device according to a comparative example. FIG. 7B is a diagram illustrating a reflection coefficient of an electronic device according to various example embodiments and a reflection coefficient of an electronic device according to a comparative example.

In the electronic device 200 according to various example embodiments, the at least one switch 522 of the matching circuit 520 may be connected, directly or indirectly, to the first element 1 (e.g., a capacitor) or the second element 2 (e.g., a capacitor) of the at least one passive element 524. In case that at least a part of the first conductive portion 2010 operates as an antenna radiator, coupling between the first conductive portion 2010 and the first electronic component 560 may occur, and the resonance frequency may be adjusted depending on a connection state between the at least one passive element 524 (e.g., the first element 1 or the second element 2) included in the matching circuit 520 and the electrical path 526.

The electronic device according to a comparative example does not include the matching circuit 520 and is in a state where the first conductive connection member 550 is not electrically connected to the ground G.

With reference to FIG. 7A, it can be seen that, in the electronic device 200 according to various example embodiments, the radiation efficiency P5 in case that the at least one switch 522 of the matching circuit 520 is connected, directly or indirectly, to the first element 1 (e.g., a capacitor) of the at least one passive element 524 and the radiation efficiency P6 in case that the at least one switch 522 of the matching circuit 520 is connected to the second element 2 (e.g., a capacitor) of the at least one passive element 524 are improved in a band of about 3300 MHz to 4200 MHz, compared to the radiation efficiency G3 of the electronic device according to the comparative example.

With reference to FIG. 7B, it can be seen that, in the electronic device 200 according to various example embodiments, the reflection coefficient P7 in case that the at least one switch 522 of the matching circuit 520 is connected, directly or indirectly, to the first element 1 (e.g., a capacitor) of the at least one passive element 524 and the reflection coefficient P7 in case that the at least one switch 522 of the matching circuit 520 is connected to the second element 2 (e.g., a capacitor) of the at least one passive element 524 satisfy a reflection coefficient of −10 dB in a band of about 3000 MHz to 3900 MHz, substantially similar to the reflection coefficient G4 of the electronic device according to the comparative example.

Figure 8:
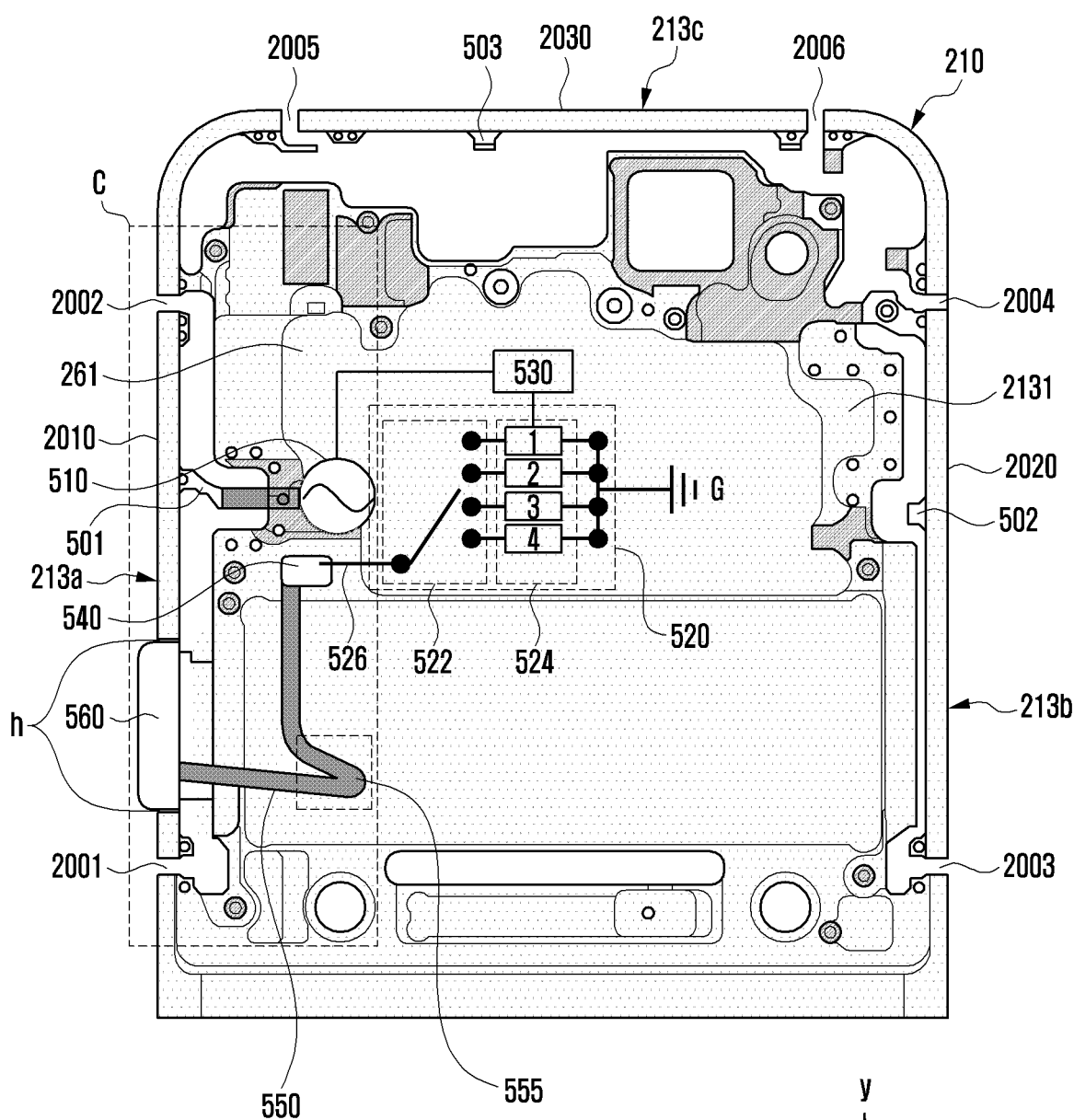
FIG. 8 is a diagram illustrating a conductive connection member of an electronic device according to various example embodiments.
Figure 9:
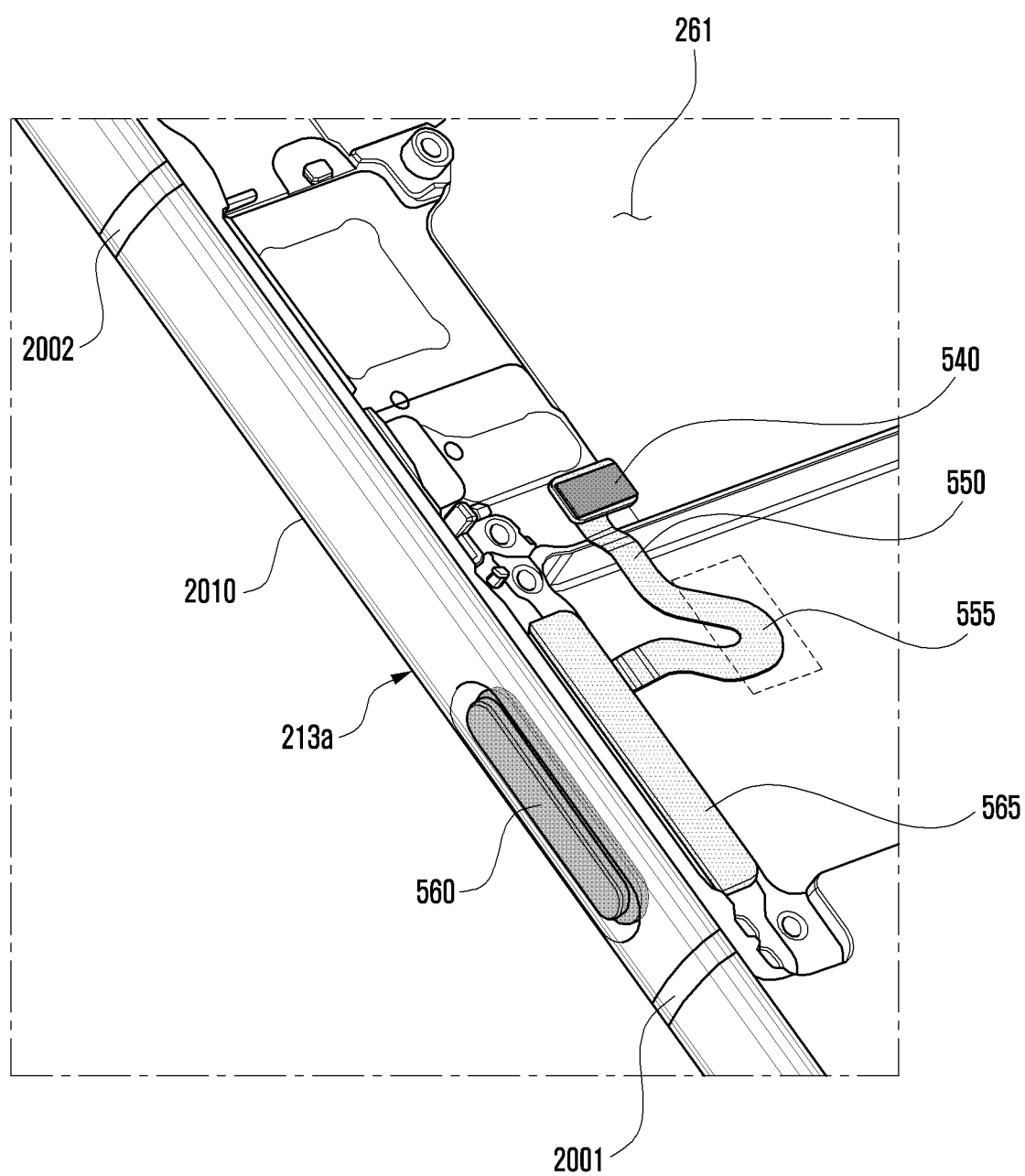
FIG. 9 is a perspective view schematically illustrating a part C of the electronic device shown in FIG. 8, as viewed from one direction, according to various example embodiments.

FIG. 8 is a diagram illustrating a conductive connection member of an electronic device according to various example embodiments. FIG. 9 is a perspective view schematically illustrating a part C of the electronic device shown in FIG. 8, as viewed from one direction, according to various example embodiments.

In an embodiment, FIG. 9 is a schematic perspective view illustrating, as viewed between the negative x-axis direction and the negative y-axis direction and from the negative z-axis direction, the part C of the electronic device 200 shown in FIG. 8 according to various example embodiments.

With reference to FIGS. 8 and 9, the first conductive connection member 550 of the electronic device 200 according to various example embodiments may include an extension portion 555. According to an embodiment, the extension portion 555 of the first conductive connection member 550 may have a length and/or shape determined based on the resonance frequency of the antenna using at least a part of the first conductive portion 2010 as an antenna radiator. In an embodiment, the extension portion 555 of the first conductive connection member 550 may be formed in a curved shape. In an embodiment, the extension portion 555 is illustrated in a curved shape, but it may be formed in a variety of other shapes. In an embodiment, a first end of the first conductive connection member 550 may be connected to the connector 540, and a second end of the first conductive connection member 550 may be connected to the PCB 565 of the first electronic component 560.

According to an embodiment, the extension portion 555 of the first conductive connection member 550 may adjust an electrical length of the antenna using at least a part of the first conductive portion 2010 as an antenna radiator. By adjusting the electrical length of the antenna that uses at least a part of the first conductive portion 2010 as an antenna radiator through the extension portion 555 of the first conductive connection member 550 and also tuning the resonance frequency of the antenna through the matching circuit 520, it is possible to improve the radiation performance of the antenna.

Figure 10:
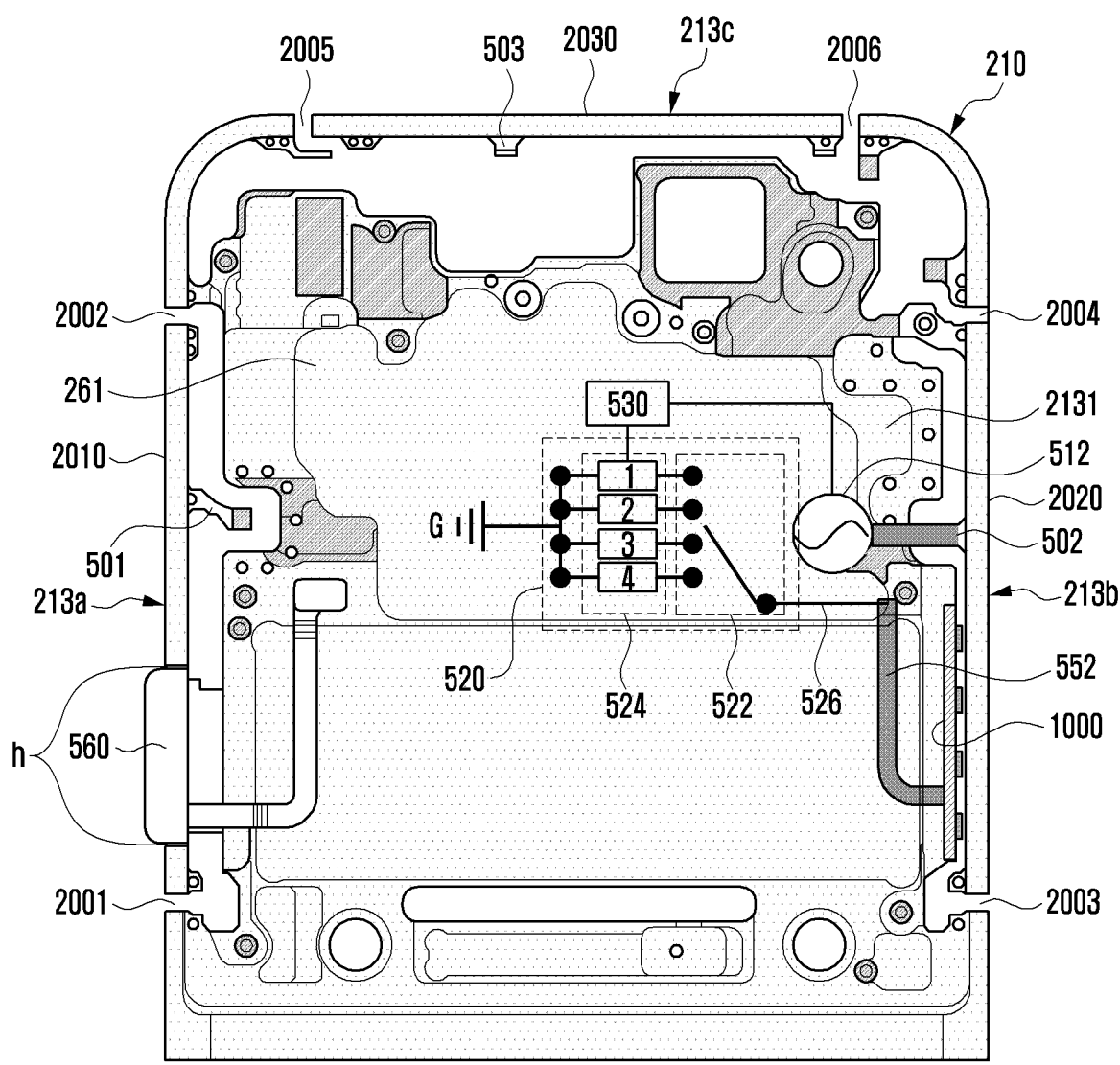
FIG. 10 is a diagram schematically illustrating a part of an electronic device including an antenna module according to various example embodiments.
Figure 10:
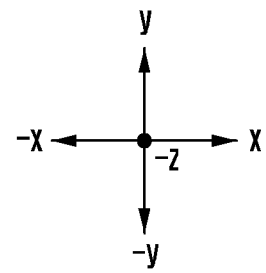

FIG. 10 is a diagram schematically illustrating a part of an electronic device including an antenna module according to various example embodiments. Each antenna module herein includes at least one antenna.

According to various embodiments, the embodiments related to the electronic device 200 illustrated in FIGS. 1 to 5C, 8 and 9 may be applied to the electronic device 200 illustrated in FIG. 10. For example, the first electronic component 560 illustrated in FIG. 5A may be applied together with an antenna module 1000 illustrated in FIG. 10. In the description of the electronic device 200 disclosed below, the same reference numbers are given to some components substantially identical with those of the embodiments illustrated in FIGS. 5A to 5C, 8 and 9, and duplicate descriptions of their functions may be omitted.

With reference to FIG. 10, the housing 210 of the electronic device 200 according to an embodiment may have the first side surface 213a, the second side surface 213b, and the third side surface 213c. The first side surface 213a may extend in the negative y-axis direction from a first portion (e.g., the negative x-axis direction) of the third side surface 213c, and the second side surface 213b may extend in the negative y-axis direction from a second portion (e.g., the x-axis direction) of the third side surface 213c.

According to an embodiment, the first side surface 213a may include the first conductive portion 2010 (e.g., an antenna radiator) formed using the first segmenting portion 2001 and the second segmenting portion 2002. For example, the first conductive portion 2010 may be disposed between at least the first segmenting portion 2001 and the second segmenting portion 2002. In an embodiment, the first conductive portion 2010 may include the first feeding point 501 inward. For example, the first feeding point 501 may be a portion protruding from the inside of the first side surface 213a in the x-axis direction. In an embodiment, the first conductive portion 2010 may be electrically connected to the first wireless communication circuit 510 (e.g., the first wireless communication circuit 510 in FIG. 5A) disposed on the printed circuit board 261 through the first feeding point 501, thereby operating as an antenna. In an embodiment, the first conductive portion 2010 may partially have a hole (h) in which the first electronic component 560 is operatively combined.

According to an embodiment, the second side surface 213b may include the second conductive portion 2020 (e.g., an antenna radiator) formed using the third segmenting portion 2003 and the fourth segmenting portion 2004. For example, the second conductive portion 2020 may be disposed between at least the third segmenting portion 2003 and the fourth segmenting portion 2004. In an embodiment, the second conductive portion 2020 may include the second feeding point 502 inward. For example, the second feeding point 502 may be a portion protruding from the inside of the second side surface 213b in the negative x-axis direction. In an embodiment, the second conductive portion 2020 may be electrically connected to the second wireless communication circuit 512 (e.g., the wireless communication module 192, comprising communication circuitry, in FIG. 1) disposed on the printed circuit board 261 through the second feeding point 502, thereby operating as an antenna.

According to an embodiment, the third side surface 213c may include the third conductive portion 2030 (e.g., an antenna radiator) formed using the fifth segmenting portion 2005 and the sixth segmenting portion 2006. For example, the third conductive portion 2030 may be disposed between at least the fifth segmenting portion 2005 and the sixth segmenting portion 2006. In an embodiment, the third conductive portion 2030 may include the third feeding point 503 inward. For example, the third feeding point 503 may be a portion protruding from the inside of the third side surface 213c in the negative y-axis direction. In another embodiment, the third conductive portion 2030 may be electrically connected to the third wireless communication circuit 513 (e.g., the third wireless communication circuit 513 in FIG. 13) disposed on the printed circuit board 261 through the third feeding point 503, thereby operating as an antenna.

According to various embodiments, the printed circuit board 261 may include a second wireless communication circuit 512, the matching circuit 520, and/or the processor 530. The antenna module 1000, comprising at least one antenna, may be disposed between at least the printed circuit board 261 and the second conductive portion 2020. For example, the antenna module 1000 may be disposed adjacent to the second conductive portion 2020.

According to an embodiment, the second wireless communication circuit 512 may be electrically connected to the second feeding point 502 disposed on the second conductive portion 2020. The second wireless communication circuit 512 may be electrically connected to the processor 530 (e.g., the processor 120 in FIG. 1). The second wireless communication circuit 512 may support the second conductive portion 2020 to transmit and/or receive a wireless signal. The second wireless communication circuit 512 may be electrically connected to the second feeding point 502 and/or the second conductive portion 2020 by using, for example, a conductive member (e.g., a C-clip).

According to an embodiment, the matching circuit 520 may be electrically connected to the processor 530 or the second wireless communication circuit 512. The matching circuit 520 may operate under the control of the processor 530 or the second wireless communication circuit 512. Using the at least one switch 522 and the at least one passive element 524, the matching circuit 520 may connect or block an electrical signal inputted to the ground G through an electrical path 526. Using the electrical path 526, the matching circuit 520 may be electrically connected to the second conductive connection member 552. The matching circuit 520 may be electrically connected to the ground G. The matching circuit 520 may be configured to electrically connect or electrically disconnect the second conductive connection member 552 and the ground G under the control of the processor 530 or the second wireless communication circuit 512.

According to various embodiments, the matching circuit 520 may include the at least one switch 522 and the at least one passive electrical element 524 (e.g., the first element 1, the second element 2, the third element 3, and/or the fourth element 4). In an embodiment, the at least one switch 522 may be selectively connected to one of the at least one passive element 524, that is, the first element 1, the second element 2, the third element 3, and/or the fourth element 4. In an embodiment, the at least one switch 522 may be electrically connected to the ground G of the printed circuit board 261 through the first element 1 to the fourth element 4. The ground G may be electrically connected to the second conductive connection member 552 through one of the at least one passive element 524 selected using the at least one switch 522. In an embodiment, the at least one passive element 524 may include, for example, a resistor, an inductor, and/or a capacitor. Under the control of the processor 530 or the second wireless communication circuit 512, the matching circuit 520 may change the electrical length between the second conductive connection member 552 and the antenna module 1000. The matching circuit 520 may include the embodiments illustrated in FIG. 5C.

According to an embodiment, the processor 530 may be electrically connected to the second wireless communication circuit 512 and the matching circuit 520. The processor 530 may control the second wireless communication circuit 512 and the matching circuit 520. The processor 530 may include a communication processor and/or a radio frequency IC (RFIC).

According to an embodiment, the second conductive connection member 552 may transmit an electrical signal under the control of the processor 530 to the antenna module 1000. A first end of the second conductive connection member 552 may be connected to the electrical path 526, and a second end may be connected to the antenna module 1000. According to an embodiment, the second conductive connection member 552 may include the extension portion 555 illustrated in FIGS. 8 and 9.

According to an embodiment, the antenna module 1000 (e.g., the antenna module 197 in FIG. 1) may be disposed at least in part between the printed circuit board 261 and the second conductive portion 2020. The antenna module 1000 and the second conductive portion 2020 may be disposed in a coupling structure. In case that at least a part of the second conductive portion 2020 operates as an antenna radiator, the antenna module 1000 may generate coupling with the second conductive portion 2020. In an embodiment, the antenna including at least a part of the second conductive portion 2020 may adjust the resonance frequency by the at least one passive element 524 included in the matching circuit 520 connected to the second conductive connection member 552. In various embodiments, the antenna module 1000 may transmit and receive a wireless signal of a first frequency band (e.g., about 3 GHz to 300 GHz). The antenna including at least a part of the second conductive portion 2020 may transmit and receive a wireless signal of a second frequency band (e.g., about 500 MHz to 6 GHz). The antenna module 1000 may include the mmWave antenna module.

Figure 11:
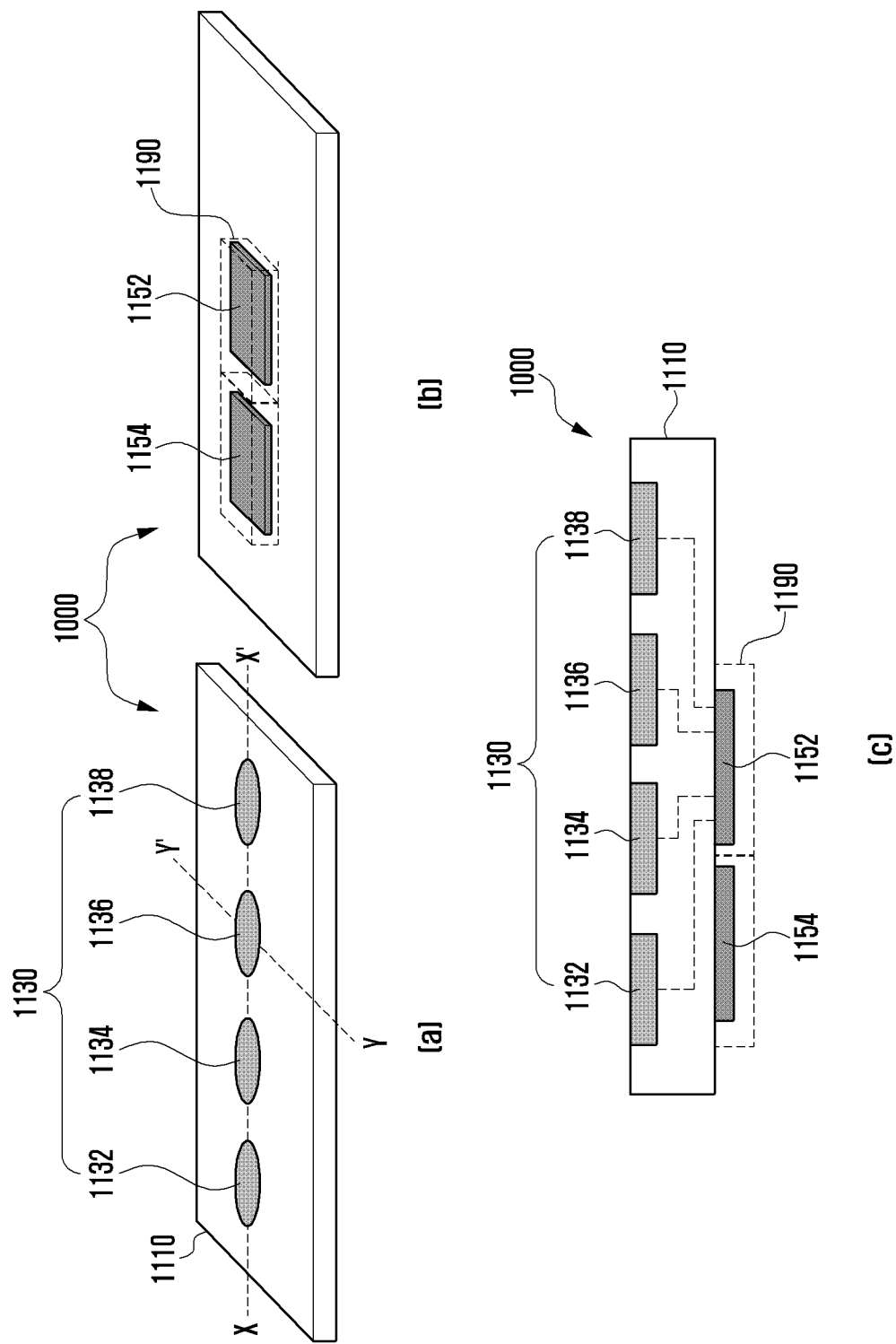
FIG. 11 is a diagram schematically illustrating an example of an antenna module included in an electronic device according to various example embodiments.

FIG. 11 is a diagram schematically illustrating an example of an antenna module included in an electronic device according to various example embodiments.

In FIG. 11, (a) is a perspective view illustrating the antenna module 1000 as viewed between the negative z-axis and the x-axis, and (b) is a perspective view illustrating the antenna module 1000 as viewed between the negative z-axis and the negative x-axis. In FIG. 11, (c) is a schematic cross-sectional view of a portion X-X' of the antenna module 1000.

With reference to (a) to (c) of FIG. 11, the antenna module 1000 may include a PCB 1110, an antenna array 1130, a radio frequency integrated circuit (RFIC) 1152, or a power management integrated circuit (PMIC) 1154. Optionally, the antenna module 1000, comprising at least one antenna, may further include a shielding member 1190 which may comprise conductive material. In various embodiments, at least one of the above-mentioned components may be omitted, or at least two of the above-mentioned components may be integrally formed.

According to an embodiment, the PCB 1110 of the antenna module 1000 may include a plurality of conductive layers and a plurality of non-conductive layers alternately stacked with the conductive layers. The PCB 1110 may provide an electrical connection between the PCB 1110 and/or various electronic components disposed outside by using wirings formed in the conductive layers and related conductive vias.

According to an embodiment, the antenna array 1130 may include a plurality of antenna elements 1132, 1134, 1136, and 1138 (e.g., one or more conductive patches) disposed to form a directional beam. The antenna elements 1132, 1134, 1136, and 1138 may be formed on a first surface of the PCB 1110 as shown. According to another embodiment, the antenna array 1130 may be formed inside the PCB 1110. According to some embodiments, the antenna array 1130 may include a plurality of antenna arrays (e.g., at least one of a dipole antenna array and/or a patch antenna array) having the same shape or different shapes and/or different types.

According to an embodiment, the RFIC 1152 may be disposed in another area (e.g., a second surface opposite to the first surface) of the PCB 1110, which is spaced apart from the antenna array 1130. The RFIC 1152 may be configured to process a signal of a selected frequency band, which is transmitted/received through the antenna array 1130. In an embodiment, upon transmission, the RFIC 1152 may convert a baseband signal obtained from a communication processor (not shown) into an RF signal of a designated band. Upon reception, the RFIC 1152 may convert an RF signal received through the antenna array 1130 into a baseband signal and transmit it to the communication processor.

According to another embodiment, upon transmission, the RFIC 1152 may up-convert an IF signal (e.g., about 9 GHz to about 11 GHz) obtained from an intermediate frequency integrated circuit (IFIC) into an RF signal of a selected band. Upon reception, the RFIC 1152 may down-convert an RF signal obtained through the antenna array 1130, convert it into an IF signal, and transmit it to the IFIC.

According to an embodiment, the PMIC 1154 may be disposed in another area (e.g., the second surface) of the PCB 1110, which is spaced apart from the antenna array 1130. The PMIC 1154 may be supplied with voltage from a main printed circuit board (e.g., the printed circuit board 261) and provide required power to various components (e.g., the RFIC 1152) on the antenna module 1000.

According to an embodiment, the shielding member 1190 may be disposed on a portion (e.g., the second surface) of the PCB 1110 to electromagnetically shield at least one of the RFIC 1152 or the PMIC 1154. The shielding member 1190 may include, for example, a shield can.

Although not shown, in various embodiments, the antenna module 1000 may be electrically connected to another printed circuit board (e.g., the printed circuit board 261) through a module interface comprising interface circuitry. The module interface may include a connection member, for example, a coaxial cable connector, a board-to-board connector, an interposer, or a flexible printed circuit board (FPCB).

Figure 12:
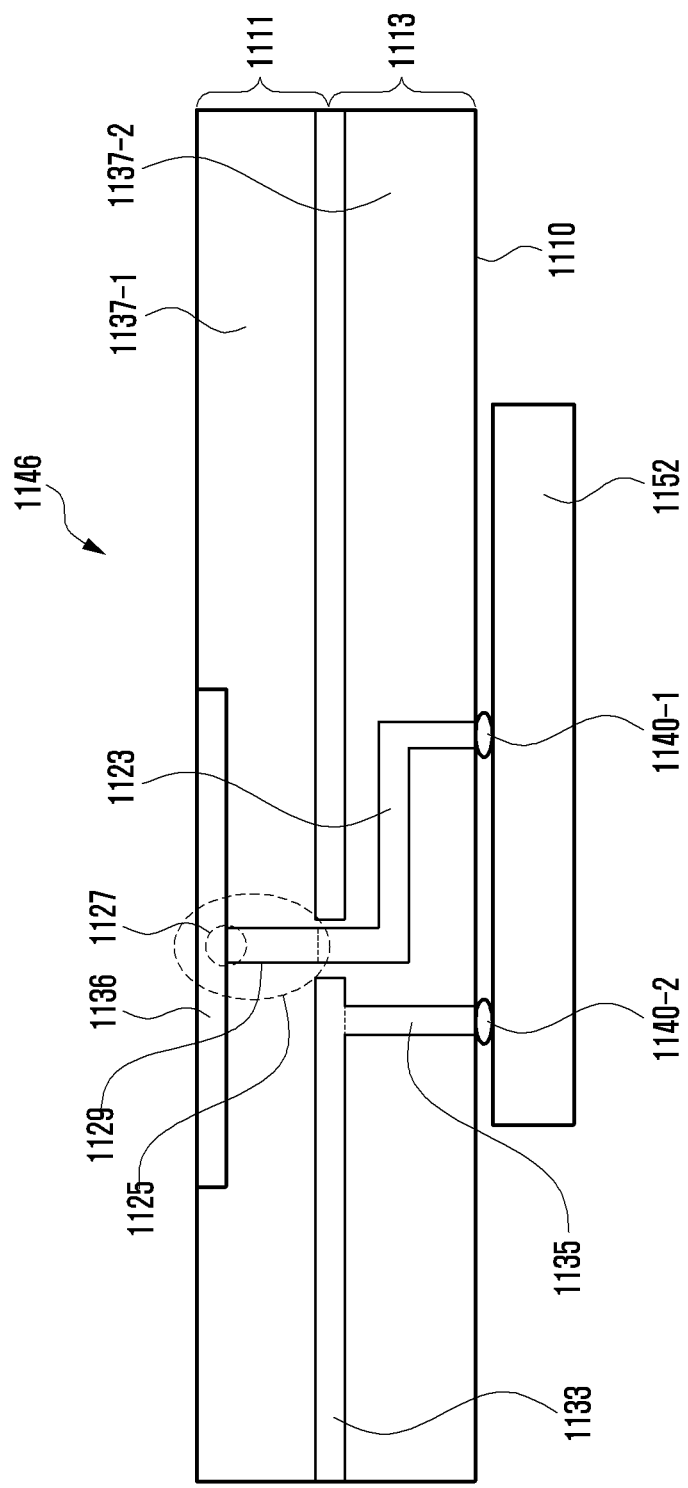
FIG. 12 is a cross-sectional view schematically illustrating a Y-Y' part of the antenna module shown in (a) of FIG. 11.

FIG. 12 is a cross-sectional view schematically illustrating a Y-Y' part of the antenna module shown in (a) of FIG. 11.

With reference to FIG. 12, the PCB 1110 of the antenna module 1000 may include an antenna layer 1111 and a network layer 1113. The antenna layer 1111 may include at least one dielectric layer 1137-1, an antenna element 1136 (e.g., at least one conductive patch) formed on the outer surface of or inside the dielectric layer 1137-1, and/or a feeding part 1125. The feeding part 1125 may include a feeding point 1127 and/or a feeding line 1129 (e.g., a signal line(s)).

According to an embodiment, the network layer 1113 may include at least one dielectric layer 1137-2, at least one ground layer 1133 formed on the outer surface of or inside the dielectric layer 1137-2, at least one conductive via 1135, and/or a transmission line 1123.

According to an embodiment, the RFIC 1152 may be electrically connected to the network layer 1113 using, for example, first and second solder bumps 1140-1 and 1140-2. In other embodiments, various connection structures (e.g., soldering or BGA) may be used instead of the solder bumps. Using the first solder bump 1140-1, the transmission line 1123, and the feeding part 1125 (e.g., the feeding line 1129 and the feeding point 1127), the RFIC 1152 may be electrically connected to the antenna element 1136. Using the second solder bump 1140-2 and the conductive via 1135, the RFIC 1152 may be electrically connected to the ground layer 1133.

Figure 13:
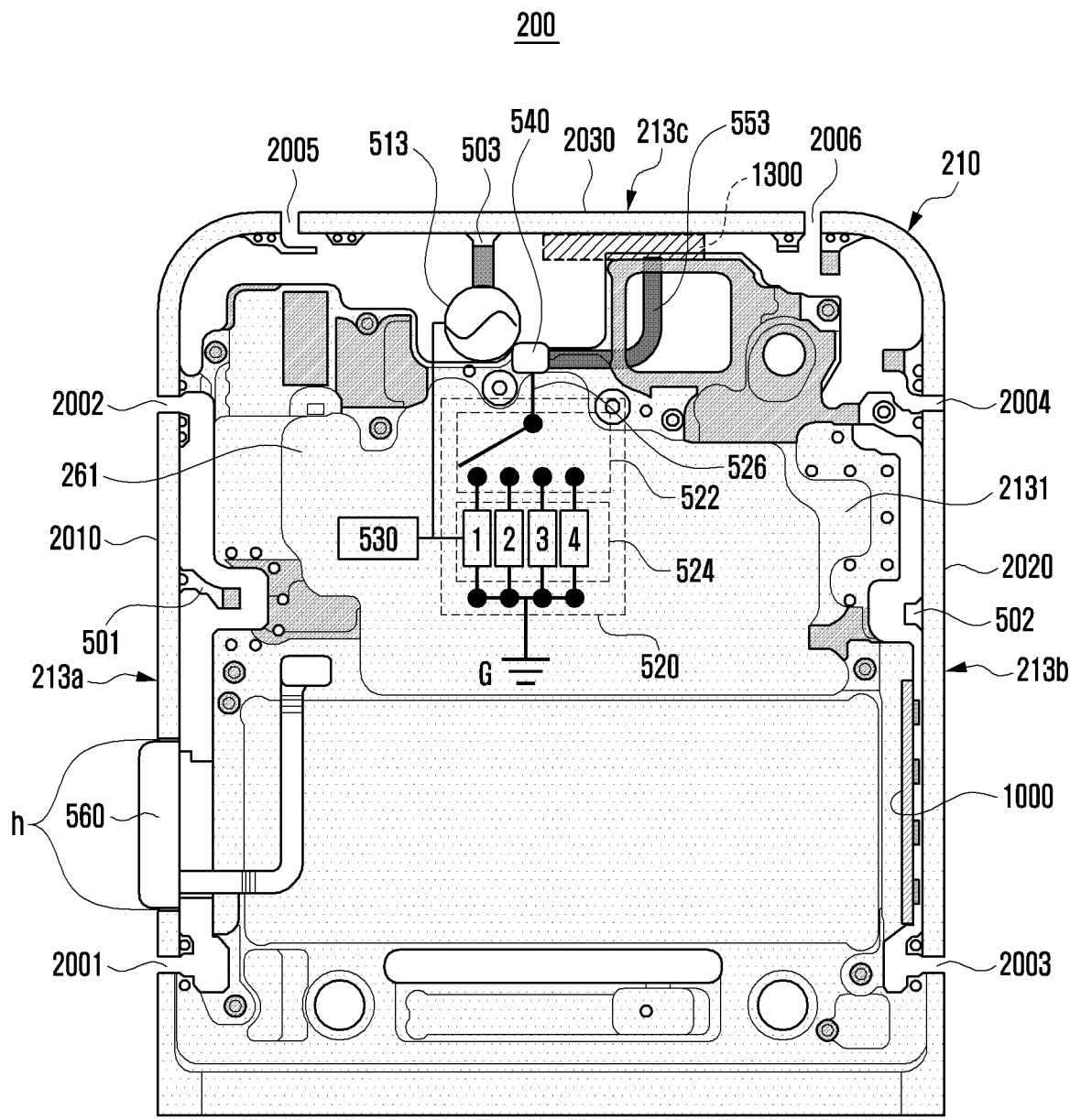
FIG. 13 is a diagram schematically illustrating a part of an electronic device including a second electronic component according to various example embodiments.

FIG. 13 is a diagram schematically illustrating a part of an electronic device including a second electronic component according to various example embodiments.

According to various embodiments, the embodiments related to the electronic device 200 illustrated in FIGS. 1 to 5C, 8, 9 and 10 may be applied to the electronic device 200 illustrated in FIG. 13. For example, the first electronic component 560 illustrated in FIG. 5A and the antenna module 1000 illustrated in FIG. 10 may be applied together with a second electronic component 1300 illustrated in FIG. 13. In the description of the electronic device 200 disclosed below, the same reference numbers are given to some components substantially identical with those of the embodiments illustrated in FIGS. 5A to 5C, 8, 9 and 10, and duplicate descriptions of their functions may be omitted.

With reference to FIG. 13, the housing 210 of the electronic device 200 according to an embodiment may have the first side surface 213a, the second side surface 213b, and the third side surface 213c. The first side surface 213a may extend in the negative y-axis direction from a first portion (e.g., the negative x-axis direction) of the third side surface 213c, and the second side surface 213b may extend in the negative y-axis direction from a second portion (e.g., the x-axis direction) of the third side surface 213c.

Each embodiment herein may be used in combination with any other embodiment described herein.

According to an embodiment, the first side surface 213a may include the first conductive portion 2010 (e.g., an antenna radiator) formed using the first segmenting portion 2001 and the second segmenting portion 2002. For example, the first conductive portion 2010 may be disposed between the first segmenting portion 2001 and the second segmenting portion 2002. In an embodiment, the first conductive portion 2010 may include the first feeding point 501 inward. For example, the first feeding point 501 may be a portion protruding from the inside of the first side surface 213a in the x-axis direction. In an embodiment, the first conductive portion 2010 may be electrically connected to the first wireless communication circuit 510 (e.g., the first wireless communication circuit 510 in FIG. 5A) disposed on the printed circuit board 261 through the first feeding point 501, thereby operating as an antenna. In an embodiment, the first conductive portion 2010 may partially have a hole (h) in which the first electronic component 560 is operatively combined.

According to an embodiment, the second side surface 213b may include the second conductive portion 2020 (e.g., an antenna radiator) formed using the third segmenting portion 2003 and the fourth segmenting portion 2004. For example, the second conductive portion 2020 may be disposed between the third segmenting portion 2003 and the fourth segmenting portion 2004. In an embodiment, the second conductive portion 2020 may include the second feeding point 502 inward. For example, the second feeding point 502 may be a portion protruding from the inside of the second side surface 213b in the negative x-axis direction. In an embodiment, the second conductive portion 2020 may be electrically connected to the second wireless communication circuit 512 (e.g., the second wireless communication circuit 512 in FIG. 10) disposed on the printed circuit board 261 through the second feeding point 502, thereby operating as an antenna(s).

According to an embodiment, the third side surface 213c may include the third conductive portion 2030 (e.g., an antenna radiator) formed using the fifth segmenting portion 2005 and the sixth segmenting portion 2006. For example, the third conductive portion 2030 may be disposed between the fifth segmenting portion 2005 and the sixth segmenting portion 2006. In an embodiment, the third conductive portion 2030 may include the third feeding point 503 inward. For example, the third feeding point 503 may be a portion protruding from the inside of the third side surface 213c in the negative y-axis direction. In another embodiment, the third conductive portion 2030 may be electrically connected to the third wireless communication circuit 513 (e.g., the wireless communication module 192 in FIG. 1) disposed on the printed circuit board 261 through the third feeding point 503, thereby operating as an antenna.

According to various embodiments, the printed circuit board 261 may include a third wireless communication circuit 513, the matching circuit 520, the processor 530, and/or the connector 540. A second electronic component 1300 may be disposed at least in part between the printed circuit board 261 and the third conductive portion 2030. For example, the second electronic component 1300 may be disposed adjacent, directly or indirectly, to the third conductive portion 2030.

According to an embodiment, the third wireless communication circuit 513 may be electrically connected to the third feeding point 503 disposed on the third conductive portion 2030. The third wireless communication circuit 513 may be electrically connected to the processor 530 (e.g., the processor 120 in FIG. 1). The third wireless communication circuit 513 may support the third conductive portion 2030 to transmit and/or receive a wireless signal. The third wireless communication circuit 513 may be electrically connected to the third feeding point 503 and/or the third conductive portion 2030 by using, for example, a conductive member (e.g., a C-clip).

According to an embodiment, the matching circuit 520 may be electrically connected to the processor 530 or the third wireless communication circuit 513. For example, the matching circuit 520 may operate under the control of the processor 530 or the third wireless communication circuit 513. Using the at least one switch 522 and the at least one passive electrical/conductive element 524, the matching circuit 520 may connect or block an electrical signal inputted to the ground G through an electrical path 526. Using the electrical path 526, the matching circuit 520 may be electrically connected to the third conductive connection member 553. The matching circuit 520 may be electrically connected to the ground G. The matching circuit 520 may be configured to electrically connect or electrically disconnect the third conductive connection member 553 and the ground G under the control of the processor 530 or the third wireless communication circuit 513.

According to various embodiments, the matching circuit 520 may include the at least one switch 522 and the at least one passive element 524 (e.g., the first element 1, the second element 2, the third element 3, and/or the fourth element 4). The at least one switch 522 may be selectively connected to one of the at least one passive element 524, that is, the first element 1, the second element 2, the third element 3, or the fourth element 4. In an embodiment, the at least one switch 522 may be electrically connected to the ground G of the printed circuit board 261 through the first element 1 to the fourth element 4. The ground G may be electrically connected to the connector 540 and/or the third conductive connection member 553 through one of the at least one passive element 524 selected using the at least one switch 522. In an embodiment, the at least one passive electrical element 524 may include a resistor, an inductor, and/or a capacitor, for example and without limitation. Under the control of the processor 530, the matching circuit 520 may control an electrical signal between the connector 540 and the ground G. The matching circuit 520 may include the embodiments illustrated in FIG. 5C.

According to an embodiment, the processor 530 may be electrically connected to the third wireless communication circuit 513 and/or the matching circuit 520. The processor 530 may control the third wireless communication circuit 513 and the matching circuit 520. The processor 530 may include a communication processor and/or a radio frequency IC (RFIC).

According to an embodiment, the connector 540 may electrically connect a portion of the printed circuit board 261 and the third conductive connection member 553. The connector 540 may be connected to the matching circuit 520 through the electrical path 526. Using the connector 540, the electrical path 526 may be electrically connected to the third conductive connection member 553. Using the at least one switch 522 and the at least one passive element 524 of the matching circuit 520, the electrical path 526 may be electrically connected to the ground G.

According to an embodiment, an electrical signal delivered through the connector 540 under the control of the processor 530 may be transmitted to the second electronic component 1300 through the third conductive connection member 553. A first end of the third conductive connection member 553 may be connected to the connector 540, and a second end may be connected to the second electronic component 1300. The third conductive connection member 553 may include the extension portion 555 illustrated in FIGS. 8 and 9.

According to an embodiment, the second electronic component 1300 may be disposed at least in part between the printed circuit board 261 and the third conductive portion 2030. The second electronic component 1300 and the third conductive portion 2030 may be disposed in a coupling structure. In case that at least a part of the third conductive portion 2030 operates as an antenna radiator, the second electronic component 1300 may generate coupling with the third conductive portion 2030. In an embodiment, the antenna including at least a part of the third conductive portion 2030 may adjust the resonance frequency by the at least one passive element 524 included in the matching circuit 520 connected to the third conductive connection member 553.

According to various embodiments, the second electronic component 1300 may include a sound output module (e.g., the sound output module 155, including circuitry, in FIG. 1) such as a speaker or a receiver, or a camera module (e.g., the camera module 180, including at least one camera, in FIG. 1).

According to various example embodiments, an electronic device 101 or 200 may include a housing 210 including a first side surface 213*a*, a first conductive portion 2010 disposed between a first segmenting portion 2001 and a second segmenting portion 2002 formed in the first side surface 213*a*, and including a first feeding point 501, a printed circuit board 261 disposed inside the housing 210 and including a ground G, a first electronic component 560 disposed adjacent, directly or indirectly, to the first conductive portion 2010, a first conductive connection member 550 electrically connected, directly or indirectly, to the first electronic component 560, a first wireless communication circuit 510 electrically connected, directly or indirectly, to the first feeding point 501, a processor 530 electrically connected, directly or indirectly, to the first wireless communication circuit 510, and a matching circuit 520 electrically connected to the first conductive connection member 550 and the ground G, and configured to electrically connect and/or disconnect the first conductive connection member 550 and the ground G under control of the processor 530. Each "processor" herein comprises processing circuitry.

According to various embodiments, the first electronic component 560 and the first conductive portion 2010 may be disposed in a coupling structure.

According to various embodiments, an antenna including at least a part of the first conductive portion 2010 may be configured to have a resonance frequency adjusted according to at least one passive element included in the matching circuit.

According to various embodiments, the matching circuit 520 may be electrically connected to the first conductive connection member 550 through an electrical path 526 and/or a connector 540.

According to various embodiments, the matching circuit 520 may include at least one switch 522, and at least one passive element 524 selectively connected to the at least one switch and having different element values.

According to various embodiments, the at least one passive electrical element 524 may include a resistor, an inductor, and/or a capacitor.

According to various embodiments, the matching circuit 520 may be configured to adjust a matching value under control of the processor 530 or the first wireless communication circuit.

According to various embodiments, the first electronic component 560 may include one of a power button, a fingerprint key, or a volume control button.

According to various embodiments, the first conductive connection member 550 may include an extension portion 555 having a specified length and/or shape.

According to various embodiments, the electronic device 101 or 200 may further include a second side surface 213*b* forming a part of the housing 210, a second conductive portion 2020 disposed between a third segmenting portion 2003 and a fourth segmenting portion 2004 formed in the second side surface 213*b*, and including a second feeding point 502, an antenna module 1000 disposed adjacent, directly or indirectly, to the second conductive portion 2020, a second conductive connection member 552 electrically connected to the antenna module 1000, and a second wireless communication circuit 512 electrically connected to the second feeding point 502 and the processor 530, wherein the matching circuit 520 may be configured to electrically connect and/or disconnect the second conductive connection member 552 and the ground G under control of the processor 530.

According to various embodiments, the antenna module 1000 and the second conductive portion 2020 may be disposed in a coupling structure.

According to various embodiments, the antenna module 1000 may be configured to operate in a first frequency band, and the second conductive portion 2020 may be configured to operate in a second frequency band.

According to various embodiments, the electronic device 101 or 200 may further include a third side surface 213*c* forming a part of the housing 210, a third conductive portion 2030 disposed between a fifth segmenting portion 2005 and a sixth segmenting portion 2006 formed in the third side surface 213*c*, and including a third feeding point 503, a second electronic component 1300 disposed adjacent, directly or indirectly, to the third conductive portion 2030, a third conductive connection member 553 electrically connected to the second electronic component 1300, and a third wireless communication circuit 513 electrically connected to the third feeding point 503 and the processor 530, wherein the matching circuit 520 may be configured to electrically connect and/or disconnect the third conductive connection member 553 and the ground G under control of the processor 530.

According to various embodiments, the second electronic component 1300 and the third conductive portion 2030 may be disposed in a coupling structure.

According to various embodiments, the second electronic component 1300 may include a sound output module (e.g., the sound output module 155 in FIG. 1) or a camera module (e.g., the camera module 180 in FIG. 1).

According to various example embodiments, an electronic device 101 or 200 may include a housing 210 including a first side surface 213a and a second side surface 213b, a first conductive portion 2010 disposed between a first segmenting portion 2001 and a second segmenting portion 2002 formed in the first side surface 213a, and including a first feeding point 501, a second conductive portion 2020 disposed between a third segmenting portion 2003 and a fourth segmenting portion 2004 formed in the second side surface 213b, and including a second feeding point 502, a printed circuit board 261 disposed at least partially inside the housing 210 and including a ground G, a first electronic component 560 disposed adjacent to, directly or indirectly, the first conductive portion 2010, an antenna module 1000 disposed adjacent to, directly or indirectly, the second conductive portion 2020, a first conductive connection member 550 electrically connected to the first electronic component 560, a second conductive connection member 552 electrically connected to the antenna module 1000, a first wireless communication circuit 510 electrically connected to the first feeding point 501, a second wireless communication circuit 512 electrically connected to the second feeding point 502, a processor 530 electrically connected to the first wireless communication circuit 510 and the second wireless communication circuit 512, and a matching circuit 520 electrically connected to the first conductive connection member 550 and the ground G and/or to the second conductive connection member 552 and the ground G, and configured to electrically connect or disconnect the first conductive connection member 550 and the ground G and/or the second conductive connection member 552 and the ground G under control of the processor 530.

According to various embodiments, the first electronic component 560 and the first conductive portion 2010 may be disposed in a coupling structure, and the antenna module 1000 and the second conductive portion 2020 may be disposed in a coupling structure.

According to various embodiments, the electronic device 101 or 200 may further include a third side surface 213c forming a part of the housing 210, a third conductive portion 2030 disposed between a fifth segmenting portion 2005 and a sixth segmenting portion 2006 formed in the third side surface 213c, and including a third feeding point 503, a second electronic component 1300 disposed adjacent, directly or indirectly, to the third conductive portion 2030, a third conductive connection member 553 electrically connected to the second electronic component 1300, and a third wireless communication circuit 513 electrically connected to the third feeding point 503 and the processor 530, wherein the matching circuit 520 may be configured to electrically connect or disconnect the third conductive connection member 553 and the ground G under control of the processor 530.

According to various embodiments, the second electronic component 1300 and the third conductive portion 2030 may be disposed in a coupling structure.

According to various embodiments, the first electronic component 560 may include one of a power button, a fingerprint key, or a volume control button, and the second electronic component 1300 may include a sound output module (e.g., the sound output module 155 in FIG. 1) or a camera module (e.g., the camera module 180 in FIG. 1).

In the foregoing, the disclosure has been described with reference to various example embodiments, but it is evident that changes and modifications made by a person ordinarily skilled in the art to which the disclosure belongs without departing from the technical spirit of the disclosure f all within the scope of the disclosure. While the above has been illustrated and described with reference to various example embodiments, it will be understood that the various example embodiments are intended to be illustrative, not limiting. It will be further understood by those skilled in the art that various changes in form and detail may be made with out departing from the true spirit and full scope of the disclosure, including the appended claims and their equivalents. It will also be understood that any embodiment(s) described herein may be used in conjunction with any other embodiment(s) described herein.

What is claimed is:

1. An electronic device comprising:
a housing including a first side surface;
a first conductive portion disposed between at least a first segmenting portion and a second segmenting portion formed in the first side surface, and including a first feeding point;
a printed circuit board disposed at least partially inside the housing and including a ground;
a first electronic component disposed adjacent to the first conductive portion;
a first conductive connection member electrically connected to the first electronic component;
a first wireless communication circuit electrically connected to the first feeding point;
a processor electrically connected to the first wireless communication circuit; and
a matching circuit electrically connected to the first conductive connection member and the ground, and configured to electrically connect and/or disconnect the first conductive connection member and the ground under control of the processor.

2. The electronic device of claim 1, wherein the first electronic component and the first conductive portion are disposed in a coupling structure.

3. The electronic device of claim 1, wherein an antenna, including at least a part of the first conductive portion, is configured to have a resonance frequency adjusted based on at least one passive electrical element included in the matching circuit.

4. The electronic device of claim 1, wherein the matching circuit is electrically connected to the first conductive connection member through an electrical path and/or a connector.

5. The electronic device of claim 1, wherein the matching circuit includes:
at least one switch; and
at least one passive element configured to be selectively connected to the at least one switch and having different element values.

6. The electronic device of claim 1, wherein the at least one passive element includes at least one of: a resistor, an inductor, or a capacitor.

7. The electronic device of claim 1, wherein the matching circuit is configured to adjust a matching value under control of the processor and/or the first wireless communication circuit.

8. The electronic device of claim 1, wherein the first electronic component includes one of a power button, a fingerprint key, or a volume control button.

9. The electronic device of claim 1, wherein the first conductive connection member includes an extension portion having a specified length and/or shape.

10. The electronic device of claim 1, further comprising:
a second side surface forming a part of the housing;
a second conductive portion disposed between at least a third segmenting portion and a fourth segmenting portion formed in the second side surface, and including a second feeding point;
an antenna module, comprising at least one antenna, disposed adjacent to the second conductive portion;
a second conductive connection member electrically connected to the antenna module; and
a second wireless communication circuit electrically connected to the second feeding point and the processor,
wherein the matching circuit is configured to electrically connect and/or disconnect the second conductive connection member and the ground under control of the processor.

11. The electronic device of claim 10, wherein the antenna module and the second conductive portion are disposed in a coupling structure.

12. The electronic device of claim 10, wherein the antenna module is configured to operate in a first frequency band, and the second conductive portion is configured to operate in a second frequency band.

13. The electronic device of claim 10, further comprising:
a third side surface forming a part of the housing;
a third conductive portion disposed between at least a fifth segmenting portion and a sixth segmenting portion formed in the third side surface, and including a third feeding point;
a second electronic component disposed adjacent to the third conductive portion;
a third conductive connection member electrically connected to the second electronic component; and
a third wireless communication circuit electrically connected to the third feeding point and the processor,
wherein the matching circuit is configured to electrically connect and/or disconnect the third conductive connection member and the ground under control of the processor.

14. The electronic device of claim 13, wherein the second electronic component and the third conductive portion are disposed in a coupling structure.

15. The electronic device of claim 13, wherein the second electronic component includes a sound output module comprising circuitry and/or a camera module comprising a camera.

16. An electronic device comprising:
a housing including a first side surface and a second side surface;
a first conductive portion disposed between at least a first segmenting portion and a second segmenting portion formed in the first side surface, and including a first feeding point;
a second conductive portion disposed between at least a third segmenting portion and a fourth segmenting portion formed in the second side surface, and including a second feeding point;
a printed circuit board disposed at least partially inside the housing and including a ground;
a first electronic component disposed adjacent to the first conductive portion;
an antenna module, comprising at least one antenna, disposed adjacent to the second conductive portion;
a first conductive connection member electrically connected to the first electronic component;
a second conductive connection member electrically connected to the antenna module;
a first wireless communication circuit electrically connected to the first feeding point;
a second wireless communication circuit electrically connected to the second feeding point;
a processor electrically connected to the first wireless communication circuit and the second wireless communication circuit; and
a matching circuit electrically connected to the first conductive connection member and the ground and/or to the second conductive connection member and the ground, and configured to electrically connect and/or disconnect the first conductive connection member and the ground and/or the second conductive connection member and the ground under control of the processor.

17. The electronic device of claim 16, wherein the first electronic component and the first conductive portion are disposed in a coupling structure, and
wherein the antenna module and the second conductive portion are disposed in a coupling structure.

18. The electronic device of claim 16, further comprising:
a third side surface forming a part of the housing;
a third conductive portion disposed between at least a fifth segmenting portion and a sixth segmenting portion formed in the third side surface, and including a third feeding point;
a second electronic component disposed adjacent to the third conductive portion;
a third conductive connection member electrically connected to the second electronic component; and
a third wireless communication circuit electrically connected to the third feeding point and the processor,
wherein the matching circuit is configured to electrically connect and/or disconnect the third conductive connection member and the ground under control of the processor.

19. The electronic device of claim 18, wherein the second electronic component and the third conductive portion are disposed in a coupling structure.

20. The electronic device of claim 18, wherein the first electronic component includes at least one of a power button, a fingerprint key, or a volume control button, and
the second electronic component includes at least one of a sound output module comprising circuitry or a camera module comprising a camera.

* * * * *